(12) United States Patent
Almblad

(10) Patent No.: US 11,383,506 B2
(45) Date of Patent: Jul. 12, 2022

(54) FOOD DISPENSING MODULE FOR A DELAMINATING FOOD DISPENSING SYSTEM

(71) Applicant: Robert Almblad, Lynchburg, VA (US)

(72) Inventor: Robert Almblad, Lynchburg, VA (US)

( * ) Notice: Subject to any disclaimer, the term of this patent is extended or adjusted under 35 U.S.C. 154(b) by 0 days.

(21) Appl. No.: 16/893,527

(22) Filed: Jun. 5, 2020

(65) Prior Publication Data

US 2020/0384754 A1 Dec. 10, 2020

Related U.S. Application Data

(63) Continuation of application No. PCT/US2018/063955, filed on Dec. 5, 2018.

(60) Provisional application No. 62/633,745, filed on Feb. 22, 2018, provisional application No. 62/595,192, filed on Dec. 6, 2017.

(51) Int. Cl.
*B32B 43/00* (2006.01)
*B65B 69/00* (2006.01)

(52) U.S. Cl.
CPC ........ *B32B 43/006* (2013.01); *B65B 69/0025* (2013.01); *Y10T 156/1174* (2015.01); *Y10T 156/195* (2015.01); *Y10T 156/1956* (2015.01)

(58) Field of Classification Search
CPC . B32B 38/10; B32B 43/006; Y10T 156/1174; Y10T 156/195; Y10T 156/1956
See application file for complete search history.

(56) References Cited

U.S. PATENT DOCUMENTS

| | | | | |
|---|---|---|---|---|
| 5,358,591 | A * | 10/1994 | Candore | B29C 63/0013 156/707 |
| 6,500,298 | B1 * | 12/2002 | Wright | B29C 63/0013 156/708 |
| 8,137,503 | B2 * | 3/2012 | Hiranaka | B32B 43/006 156/703 |
| 8,877,006 | B2 * | 11/2014 | Ahn | B32B 37/00 156/715 |
| 2006/0283153 | A1 | 12/2006 | Nakano | |
| 2008/0281082 | A1 | 11/2008 | Almblad et al. | |
| 2009/0025875 | A1 * | 1/2009 | Hagman | B32B 43/006 156/711 |

(Continued)

FOREIGN PATENT DOCUMENTS

| | | |
|---|---|---|
| WO | WO2006125058 | 11/2006 |
| WO | WO2013117530 | 8/2013 |

OTHER PUBLICATIONS

International Search Report and Written Opinion of International Searching Authority for PCT Patent Application PCT/US2018/63955 dated Mar. 27, 2019.

*Primary Examiner* — Philip C Tucker
*Assistant Examiner* — Nickolas R Harm
(74) *Attorney, Agent, or Firm* — Michael J. Nickerson; Basch & Nickerson LLP

(57) ABSTRACT

A food dispensing module for a delaminating food dispensing system includes an outer housing; and a delaminating housing. The delaminating housing has a first portion being located within said outer housing and a second portion located outside said outer housing. The delaminating housing includes delaminating nips, a first film take-up roller, a second film take-up roller, an output opening, and a trap void. The output opening is located in the second portion of the delaminating housing.

20 Claims, 21 Drawing Sheets

(56) References Cited

U.S. PATENT DOCUMENTS

2012/0151882 A1    6/2012   Nakano
2015/0367624 A1* 12/2015   Tokuda ................ B65C 9/0006
                                                                  156/702

* cited by examiner

FOOD DISPENSING MODULE FOR A DELAMINATING FOOD DISPENSING SYSTEM

PRIORITY INFORMATION

The present application is a continuation application of PCT Patent Application Number PCT/US2018/063955, filed on Dec. 5, 2018, and claims priority, under 35 U.S.C. § 120, from PCT Patent Application Number PCT/US2018/063955, filed on Dec. 5, 2018. The entire content of PCT Patent Application Number PCT/US2018/063955, filed on Dec. 5, 2018, is hereby incorporated by reference.

PCT Patent Application Number PCT/US2018/063955 claims priority, under 35 U.S.C. § 119(e), from U.S. Provisional Patent Application Ser. No. 62/595,192, filed on Dec. 6, 2017. The entire content of U.S. Provisional Patent Application Ser. No. 62/595,192, filed on Dec. 6, 2017, is hereby incorporated by reference.

PCT Patent Application Number PCT/US2018/063955 claims priority, under 35 U.S.C. § 119(e), from U.S. Provisional Patent Application Ser. No. 62/633,745, filed on Feb. 22, 2018. The entire content of U.S. Provisional Patent Application Ser. No. 62/633,745, filed on Feb. 22, 2018, is hereby incorporated by reference.

BACKGROUND

Various types of cooking devices are known in the art. Specifically, various types of grills are known. In one type of grill, the food is placed on a grilling surface, grilling the side of the food that contacts the grilling surface. After that side of the food is cooked, the food is manually turned or flipped to cook the opposite side. After the second side of the food is cooked, the food is removed from the grill for further preparation and/or serving.

In another type of grill, two-sided cooking is accomplished simultaneously. Such grills are commonly known as clamshell grills and have upper and lower cooking platens that are horizontally opposed for contacting the two sides of a food item simultaneously to thereby cook both sides simultaneously.

For proper performance, the two grilling surfaces should be parallel to each other so that each surface uniformly contacts and cooks the associated side of the food item that contacts a respective platen cooking surface.

There is a large amount of activity in the general field of restaurant automation in context of hygienic handling of various food product(s), and several studies and researches as well as invention(s) have delved upon the subject(s) of 'packaging' and 'unpackaging' procedures/methods. Protocols such as lamination, sheet-layering, foil packaging and peeling off, dismantling and delamination, at the manufacture sites (food processing factories/units) and usage sites (restaurants, hotels and eating points) are known to be in existence in the prior art profile.

The prior art discloses patents on delamination of a laminate, use of conveyor belts to transport laminated food products from one place to other, as well as use of several methods for unpacking the laminated food products such as peeling of film, delamination of laminated food and also in some cases the deployment of stripper unit. However, the prior art profile does not eliminate the need of human interference such as the food product directly passed on to a cooking unit.

U.S. Pat. No. 5,141,584 discloses an apparatus and method for delaminating a composite sheet structure of the kind comprising a vertically frangible layer having a first surface adhesively bonded to a first sheet at a substantially uniform strength and an opposite surface abutting areas which are, respectively, adhesively bonded to a second sheet at strengths less or greater than the uniform strength and having a marginal portion or tab extending beyond the first sheet. The composite sheet structure is fed into the nip of upper and lower peel rollers and upon passage therethrough a strip sheet roller is rotated into position to bend and hold the laminate against the upper peel roller in a position to fracture the tab from the first sheet. On reversal of the feed direction and passage of the laminate back through the nip of the strip sheet and upper peel rollers, the thicker "keeper sheet" of the flexed laminate breaks from the "throw-away" sheet containing the tab at the preformed tab. A roller configuration and drive train structure are provided that provides a more predictable and repeatable steady state condition and allows for control of the location of the peel point to be accomplished.

Another conventional system is a method and device for packaging or unpackaging portions of a deep-frozen food product. The conventional system provides details about how the process packs portions of low temperature foodstuff, arranged with longitudinal separations in a row behind one another. The portions are guided between two strips of foil packaging which are then combined to form a ribbon. The portions may be placed in chambers in one of the strips, which are arranged along it with equal spacings. Each strip may also have half-chambers and may be guided together to align corresponding half-chambers with each other prior to the introduction of a portion into one or both of them.

U.S. Pat. No. 6,244,019 discloses a system for packaging and unpackaging can lids. The system relates to packages for stacked can lids, a method of producing such packages, devices for implementing said method, devices for automated unpacking of the above nature and a system for packing and unpacking can lids. The packages are formed with an open end, which is closed in that the bag end, when in unfolded condition, is compressed and is provided with fastening means retaining the closed condition.

In addition, the closing device closes the open package end by compressing the bag end in the unfolding condition and in that fastening means are applied retaining said dosed condition, and the unpacking device causes relative movement of the packages and the can lids contained therein in such a manner that the can lids are pressed against the package end closed by means of the fastening means.

The features of the afore-mentioned prior art disclose complex design and bulky structural indices thereby hindering utilization in restaurant automation devices. Moreover, none addresses the use of restaurant automation in highly aseptic conditions by eliminating human interference during transfer of food products from refrigerated storage to cooking unit.

Therefore, it is desirable to provide a system that enables the automation of a meat cooking apparatus which minimizes human interaction and provides an efficient and consistent cooking process.

BRIEF DESCRIPTION OF THE DRAWING

The drawings are only for purposes of illustrating various embodiments and are not to be construed as limiting, wherein.

DETAILED DESCRIPTION OF THE DRAWINGS

Figure 1:
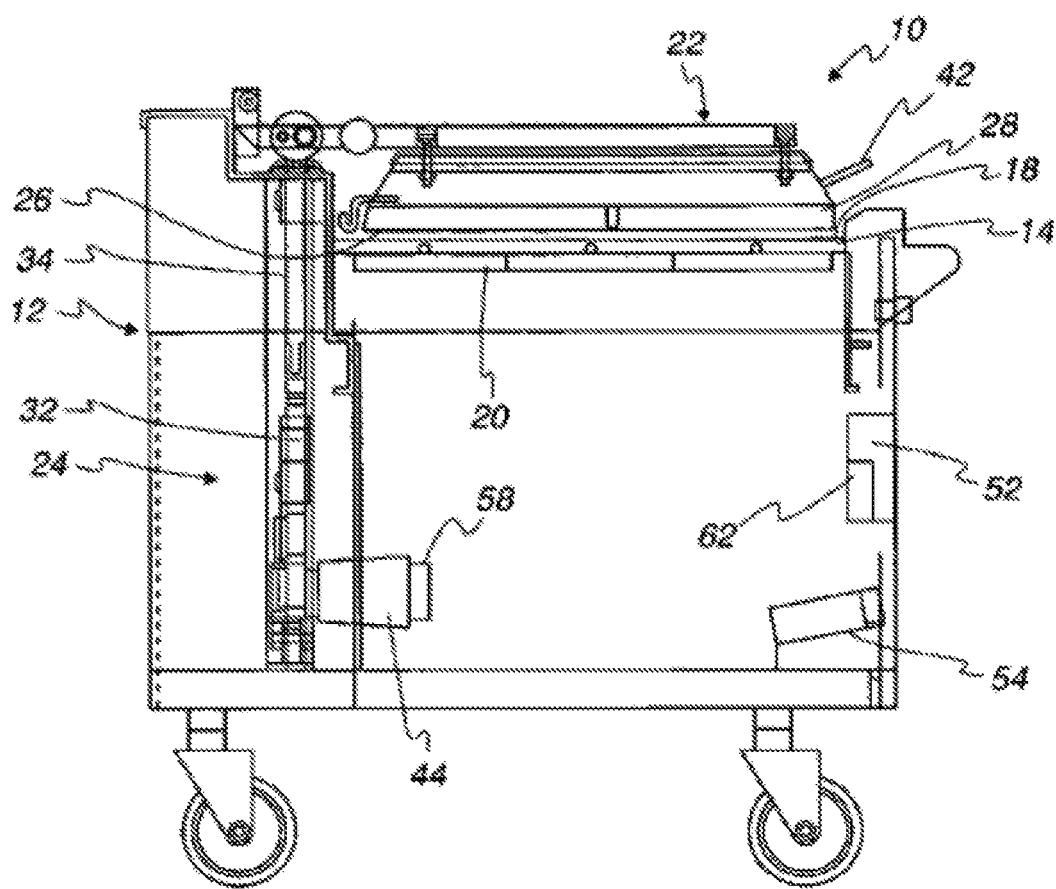
FIG. 1 is a side view of a clamshell grill.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates an example of a system of cooking food with a dual-surface grill. The grill is of the type that has upper and lower cooking platens. The system automatically determines prior to the start of a cooking cycle whether an upper cooking platen and a lower cooking platen are substantially parallel to each other when in a cooking position.

If the upper platen and the lower platen are substantially parallel to each other, the food is contacted with the upper and lower platens to cook the food. If the upper and lower platens are not substantially parallel to each other, at least one of the upper and lower platens is adjusted so that the upper and lower platens are at least substantially parallel to each other when in a cooking position.

After the adjustment, if necessary, the food is contacted with the upper and lower platens to thereby cook the food.

As illustrated in FIG. 1, a clamshell grill 10 provides the cooking function. The clamshell grill 10 includes a support structure 12 to which a lower cooking platen 14 is horizontally mounted. Lower platen 14 has a generally smooth, flat cooking surface 18 on its upper side. Lower platen 14 is heated to cooking temperature by one or more heating units 20, which may be gas or electric.

An upper platen assembly 22 is movably mounted to the rear of support structure 12 by means of an upper platen positioning mechanism 24. Upper platen assembly 22 comprises an upper cooking platen 28 heated to cooking temperature by heating elements mounted within a casing. Upper cooking platen 28 may be of an equivalent size to lower cooking platen 14. The upper platen 28 has a flat cooking surface 26 and may be independently heated.

It is noted that by mounting independent upper platen assemblies over a single lower platen, independent cooking zones between upper platen cooking surfaces and lower platen cooking surface may be created to allow greater flexibility for the cook/operator. For example, one upper platen assembly may be used to cook one food product, while other food products can be simultaneously cooked with respect to adjacent upper platen assemblies.

In another example, one batch of food product, for example hamburger patties, may be in the middle of a cooking cycle with respect to a first upper platen assembly. If additional food product needs to be cooked, the cooking of additional food product may be initiated at the other upper platen assemblies, while the patties continue to cook at the first upper platen assembly.

Figure 2:
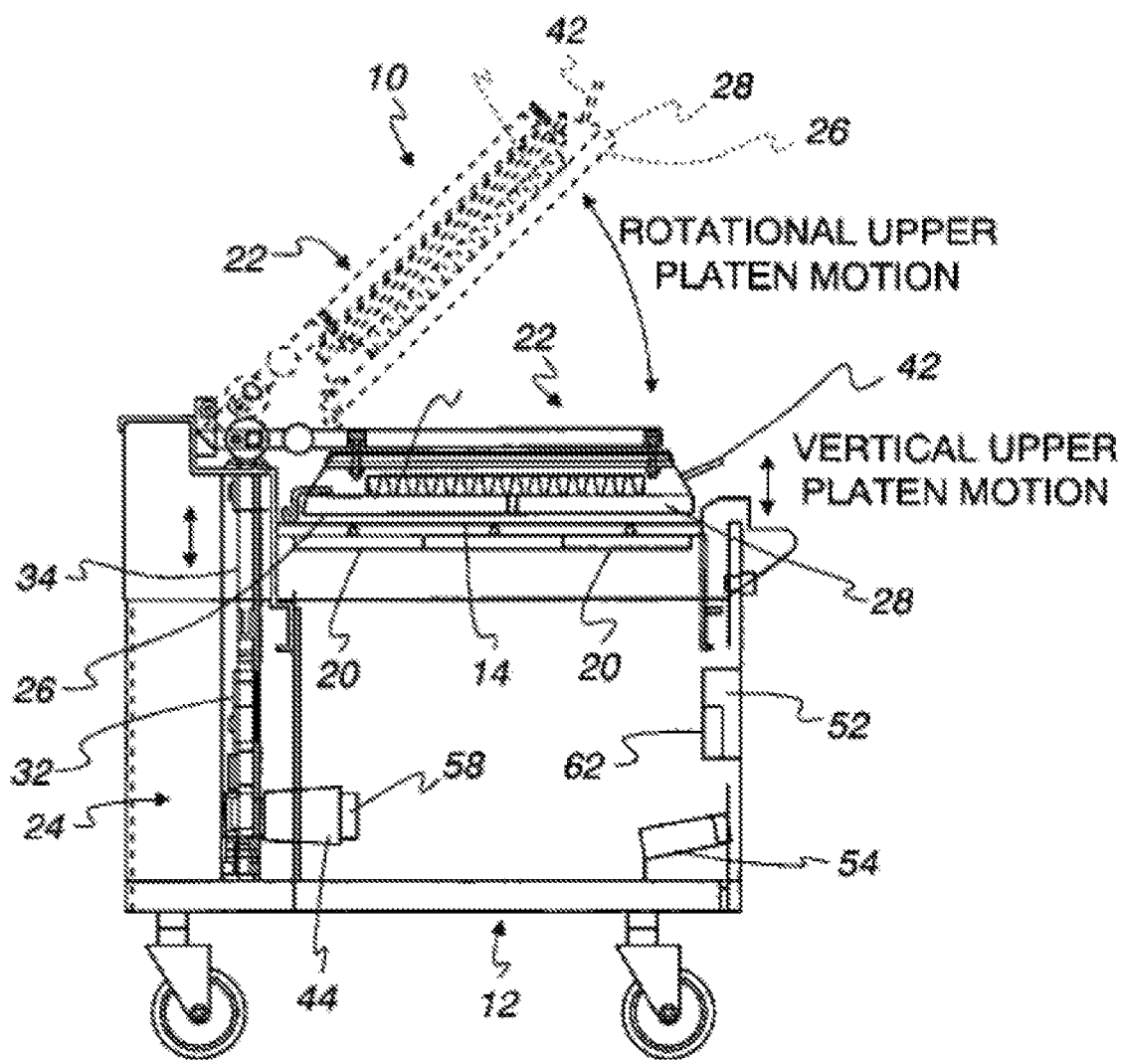
FIG. 2 is a side view of the grill of FIG. 1 illustrating movement of the upper platen between a fully open position and the cooking orientation.

As illustrated in FIG. 2, positioning mechanism 24 may be used to facilitate two distinct motions by upper platen assembly 22 from its uppermost position to a cooking position. One motion is a rotational motion to rotate upper platen assembly 22 from an upward open position to a downward horizontal cooking position parallel to lower platen 14. The other motion is a linear vertical motion to space a horizontally oriented upper platen assembly 22 relative to the lower platen 14.

To provide the vertical movement to change the height of upper platen assembly 22 relative to cooking surface 18, a linear actuator 32 is linked to two vertical reciprocating shafts 34 by an actuator cross bar linkage. Actuator cross bar linkage is clamped to vertical reciprocating shafts 34, which run through linear motion bearings. The rotational movement of upper platen assembly 22 may be manually accomplished by means of a handle 42.

A linear actuator assembly comprises a drive motor 44, linear actuator 32, two substantially vertical reciprocating shafts 34, and position sensor switches. Linear actuator 32, when activated, moves upper platen assembly 22 and upper platen 28 vertically. The rotation providing mechanism rotates upper platen assembly 22 upwards from a horizontal orientation to an open position, as shown in FIG. 2, as linear actuator 32 completes its upward stroke. Likewise, as linear actuator 32 begins its downward stroke, the rotation providing mechanism rotates the upper platen assembly 22 back to a horizontal, or closed, orientation.

Grill 10 includes a user interface 52. Interface 52 includes an activation button to start a cooking cycle when it is depressed to start a cooking cycle. At that time, user interface 52 sends information to a microprocessor 62 that is in data communication with a motor position controller 54. This information is used by motor position controller 54 to activate linear drive motor 44.

In a typical cooking cycle, the grill apparatus begins in an inactive state, with its upper platen assembly in its fully opened and raised position. The upper platen assembly is at an angle from horizontal. The operator will select the relevant product setting, from the menu on a control panel, and then will load the food product, a single layer thick, across the surface area of lower platen. When loading is complete, the operator will depress an activation button to initiate the cook cycle.

An example of a dual sided cooking grill is disclosed in U.S. Pat. No. 8,359,970. The entire content of U.S. Pat. No. 8,359,970 is hereby incorporated by reference.

Another example of a dual sided cooking grill is disclosed in U.S. Pat. No. 9,301,646. The entire content of U.S. Pat. No. 9,301,646 is hereby incorporated by reference.

To fully automate a grill cooking system, a system of automatically providing a food product to the grill system and a system of automatically removing the cooked product from the grill system and moving it to a preparation or staging area would be desired.

To facilitate automatically providing a food product to the grill system, FIGS. 3 through 11 provide illustrations of a food dispensing assembly.

Figure 3:
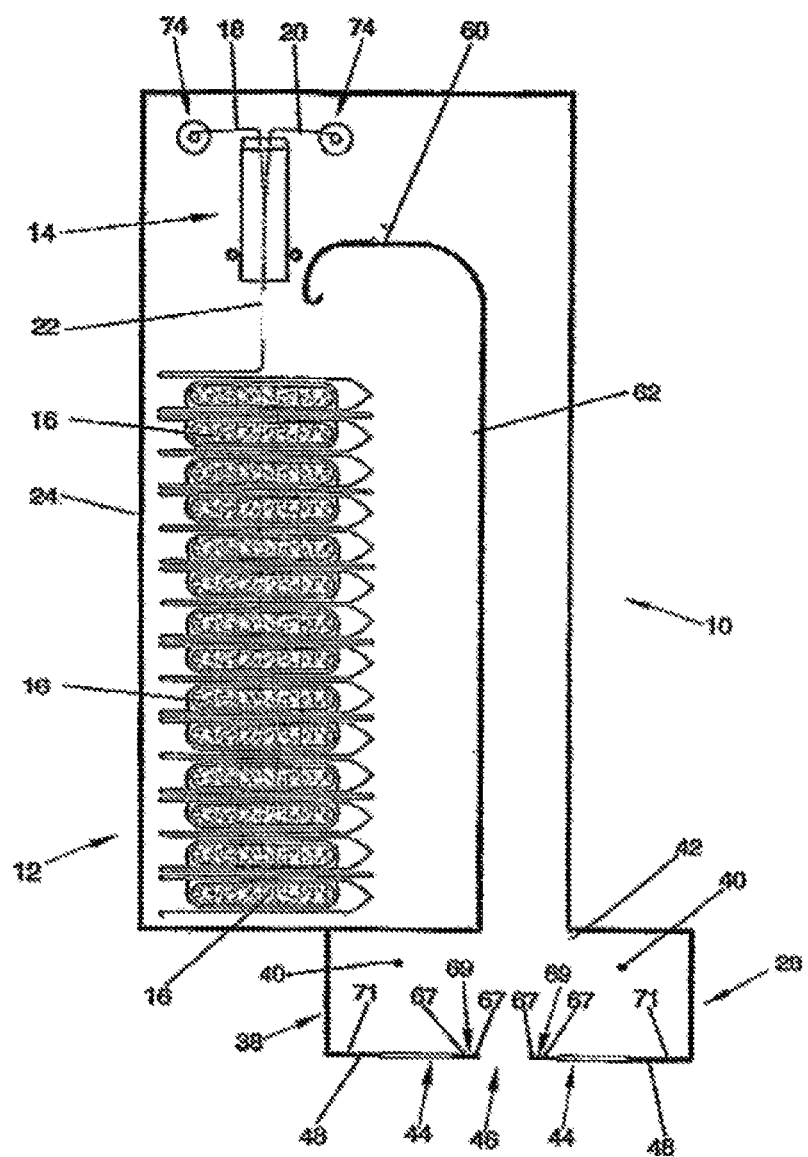
FIG. 3 is a front view of the food handling system with the food dispensing assembly stored within the food storage assembly.
Figure 4:
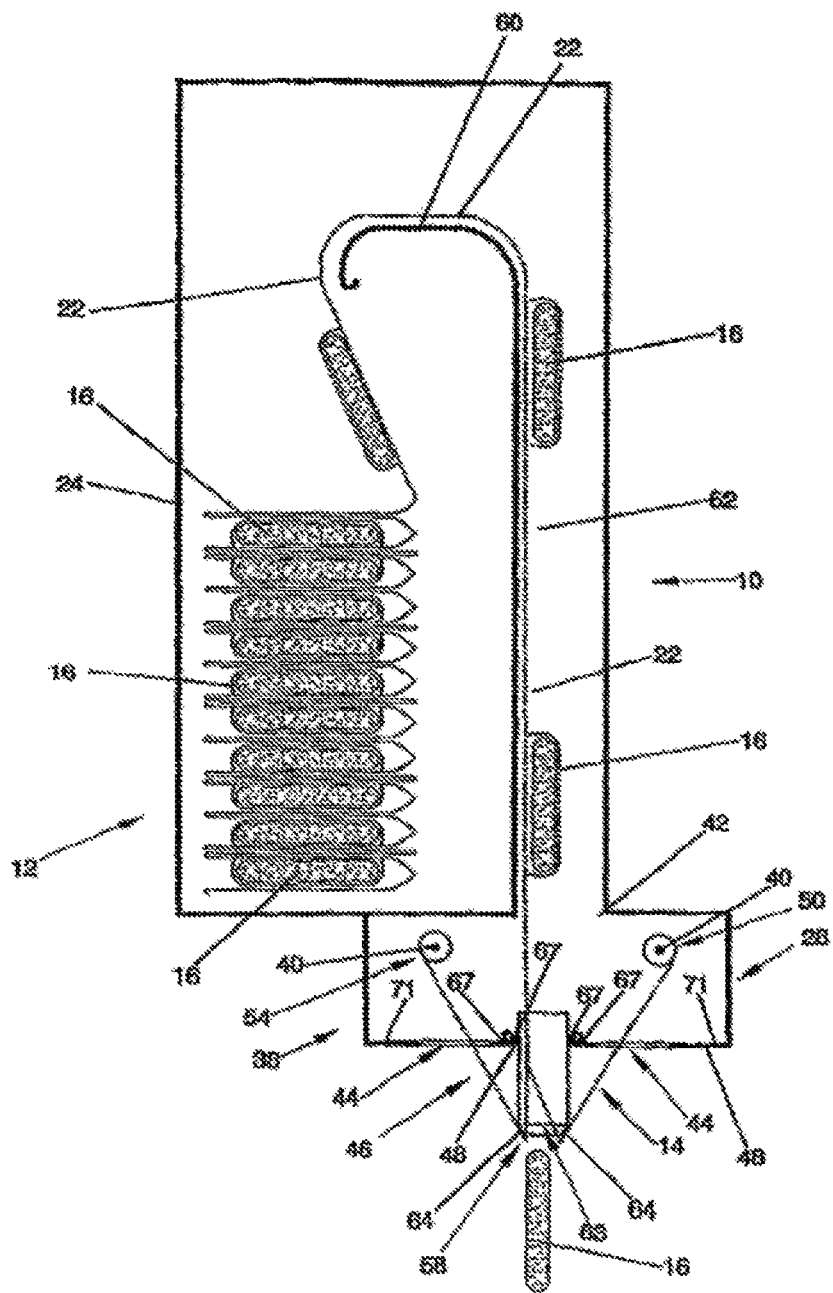
FIG. 4 is a front view of the food handling system with the food dispensing assembly deployed in the dispensing configuration.

As illustrated in FIGS. 3 and 4, a food handling system 10 stores and dispenses food products including a food storage assembly 12 to store the food products therein and a food dispensing assembly 14 to dispense the food products from the food dispensing assembly 14 of the food handling system 10.

Figure 5:
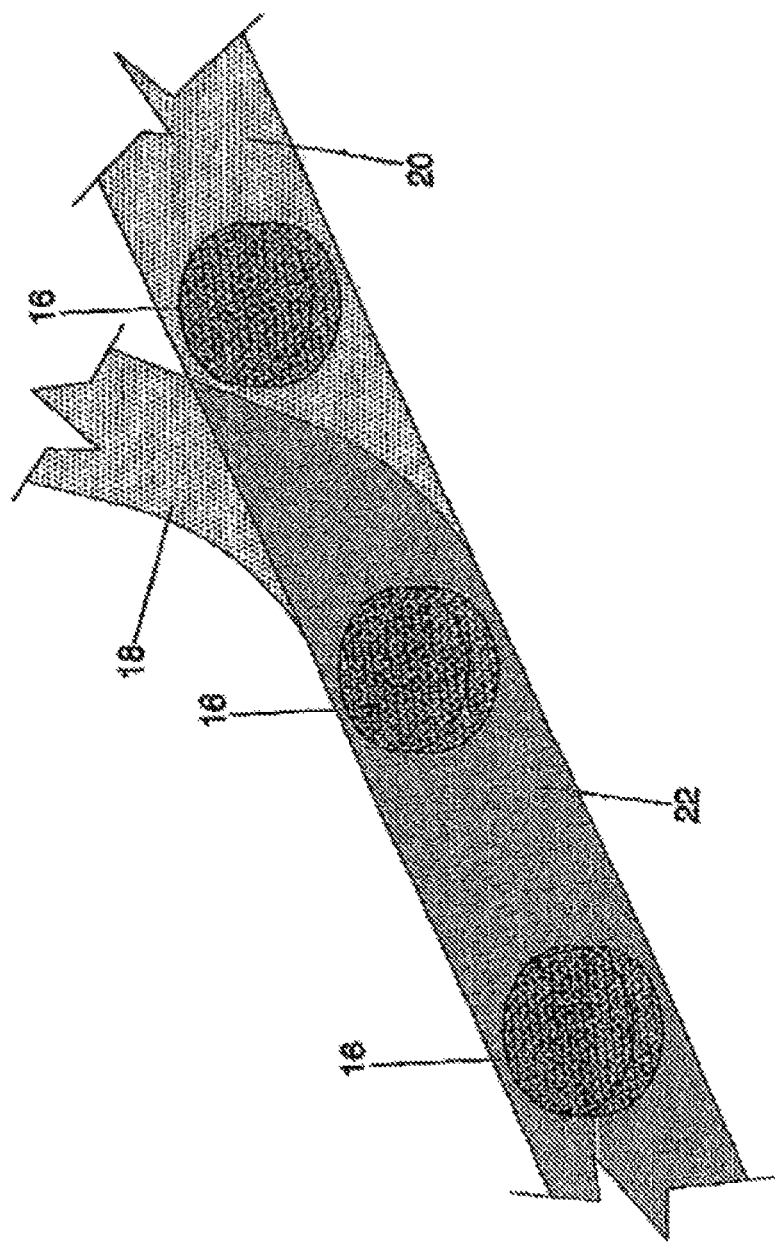
FIG. 5 is a perspective view of a food product hygienically encased within a continuous laminated food strip.

As illustrated in FIG. 5, food products 16, such as hamburger patties, are packaged between a first elongated strip of flexible material or film 18 and a second elongated strip of flexible material or film 20. The first elongated strip of flexible material or film 18 and the second elongated strip of flexible material or film 20 may be sealed together by heat and/or pressure to cooperatively form a continuous laminated food strip 22 to protect the food products 16 there between for storage within the food storage assembly 12 until the first elongated strip of flexible material or film 18 and the second elongated strip of flexible material or film 20 are separated by the food dispensing assembly 14 to dispense the food products 16 from the food handling system 10 as described more fully hereinafter.

As illustrated in FIGS. 3 and 4, the food products 16 are fan folded as a series of food products 16 stacked one upon another in a dispensing configuration or disposition when stored within the food storage assembly 12. As will be evident, the food products 16 are stored and dispensed onto a dish, conveyor, or other surface (not shown) in a hygienic manner without handling or touching by a human operator.

As illustrated in FIGS. 3 and 4, the food storage assembly 12 includes a hollow food product storage enclosure or carton 24 to house and support the plurality of food products 16 sealed or disposed between the first elongated strip of flexible material or film 18 and the second elongated strip of flexible material or film 20 of the continuous laminated food strip 22 stacked in the fan folded configuration.

Figure 6:
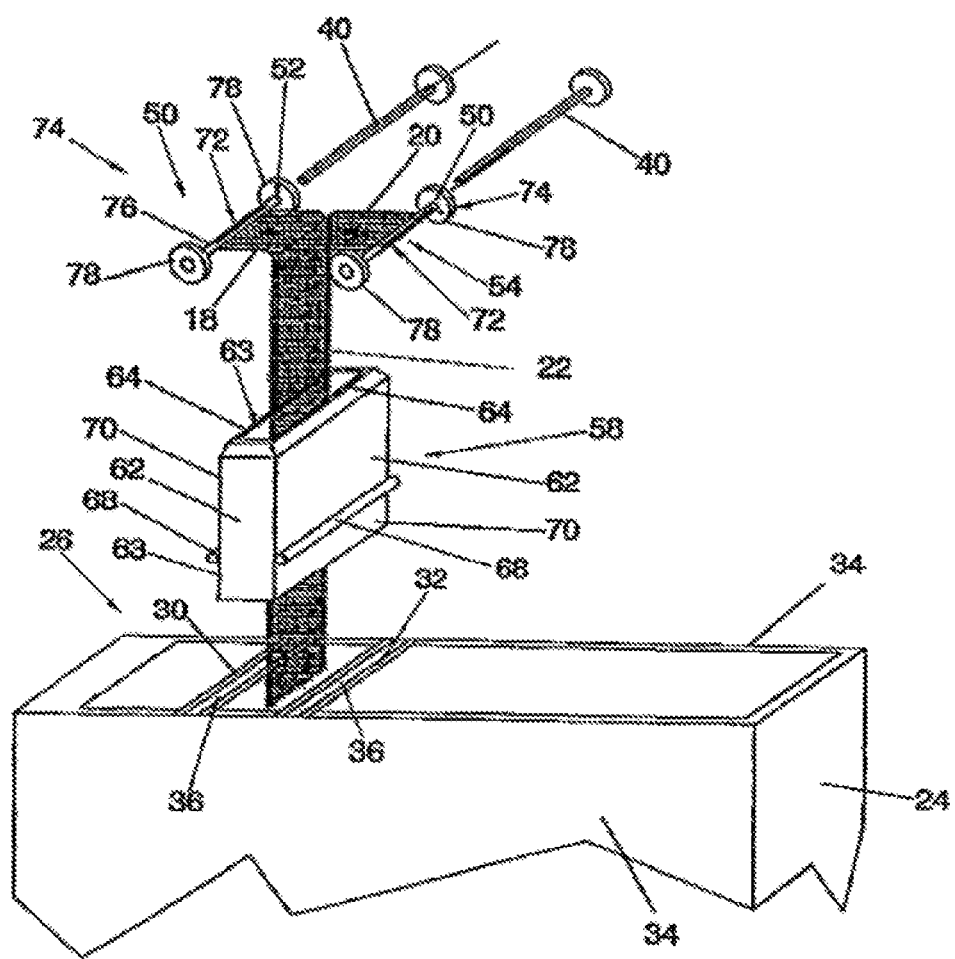
FIG. 6 is a partial exploded view of the upper portion of the food product storage enclosure or carton showing the food dispensing assembly.

As illustrated in FIG. 6, a food dispensing assembly storage support 26 is disposed in the upper portion of the hollow food product storage enclosure or carton 24 of the food storage assembly 12 to support the food dispensing assembly 14 before use.

Figure 7:
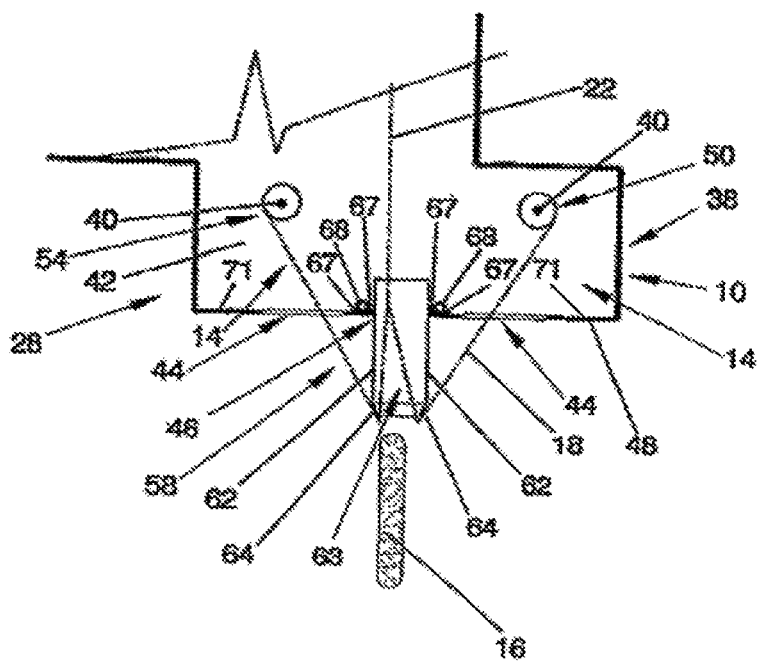
FIG. 7 is a partial detailed schematic front view of the food dispensing assembly deployed in the dispensing configuration.

As illustrated in FIGS. 3 and 4, a food dispensing assembly support 28 is disposed on the lower portion thereof to operatively support the food dispensing assembly 14 when deployed to separate the first elongated strip of flexible material or film 18 and the second elongated strip of flexible material or film 20 to dispense the food products 16 serially and individually from the food dispensing assembly 14 of the food handling system 10, As illustrated in FIGS. 4 and 7.

As illustrated in FIG. 6, the food dispensing assembly storage support 26 comprises a first food dispensing assembly support member 30 and a second food dispensing assembly support member 32 extending between the upper portion of opposite side walls each indicated as 34 of the hollow food product storage enclosure or carton 24. The first food dispensing assembly support member 30 and the second food dispensing assembly support member 32 each includes a groove or channel 36 to receive and support a portion of the food dispensing assembly 14 as described more fully hereinafter.

As illustrated in FIGS. 3, 4, and 7, the food dispensing assembly support 28 includes a food dispensing assembly support housing 38 having a pair of rotatably mounting members or pins each indicated as 40 mounted to a substantially vertically disposed support wall or member 42 and a pair of film separation slots or openings each indicated as 44 and a centrally dispensed laminated strip opening 46 formed through a substantially horizontally disposed lower wall 48 extending outwardly from the substantially vertically disposed support member 42 to receive the first elongated strip of flexible material or film 18 and the second elongated strip of flexible material or film 20, and the continuous laminated food strip 22 respectively when the food dispensing assembly 14 is operatively mounted on the food dispensing assembly support 28 as described more fully hereinafter.

Figure 8:
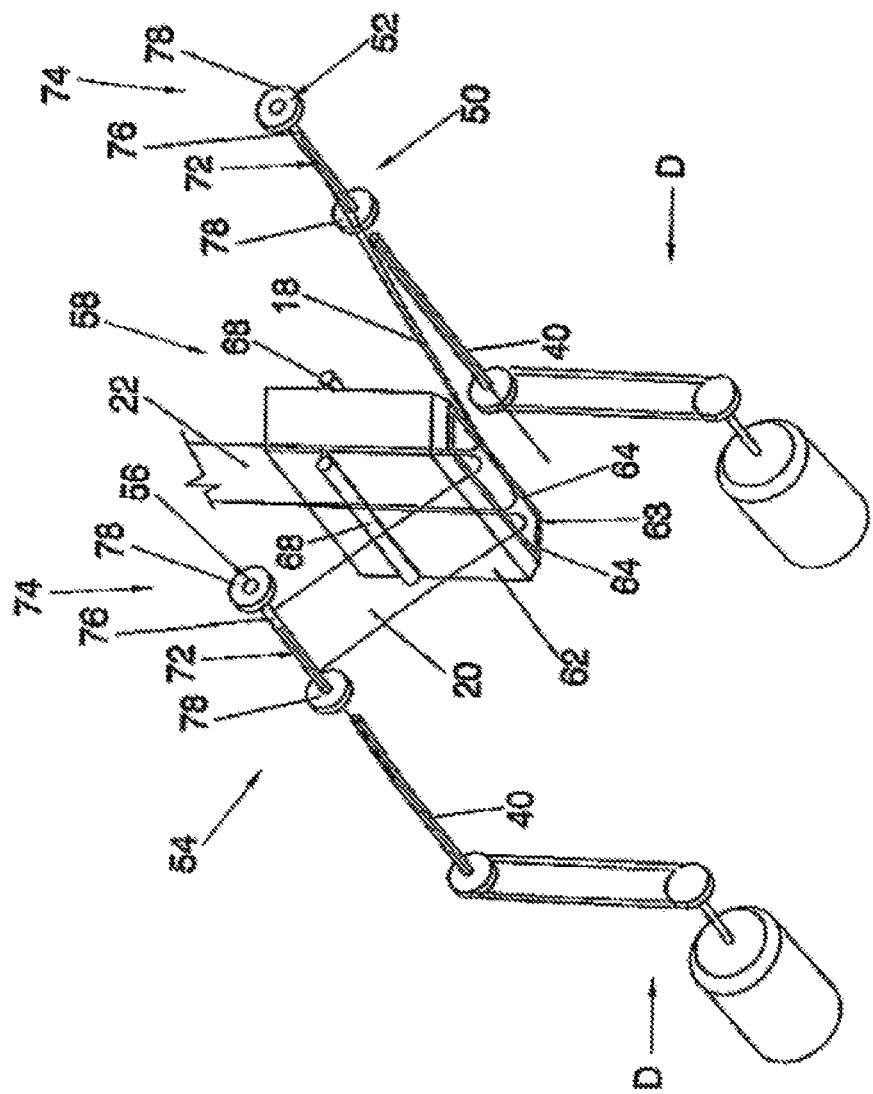
FIG. 8 is a partial perspective view of the food dispensing assembly deployed in the dispensing configuration.

As illustrated in FIGS. 7 and 8, the food dispensing assembly 14 includes a first film strip reel or film take-up device 50 including a centrally disposed pin mounting channel 52 coupled to the leading end portion of the first elongated strip of flexible material or film 18 and a second film strip reel or film take-up device 54 including a centrally disposed pin mounting channel 56 coupled to the leading end portion of the second elongated strip of flexible material or film 20 such that when the first film strip reel or film take-up device 50 and the second film strip reel or film take-up device 54 are mounted on the corresponding rotatable mounting member or pin 40 extending through centrally disposed pin mounting channels 52 and 56, respectively.

The food dispensing assembly 14 further includes a food strip directional control 58 mounted to the substantially horizontally disposed lower wall 48 of the food dispensing assembly support 38 to change the direction of travel of the continuous laminated food strip 22 directed to the food dispensing assembly 14 by a laminated food strip guide comprising an upper arcuate guide member 60 and a substantially vertical guide member 62 disposed within the food storage assembly 12.

The food strip directional control 58 comprises a pair of directional control members each indicated as 62 disposed in spaced relationship to cooperatively form a film slot or channel 63 to receive the continuous laminated food strip 22 and the food products 16 therethrough each directional control member 62 includes a directional control surface 64 to engage the outer surfaces of the first elongated strip of flexible material or film 18 and second elongated strip of flexible material or film 20 when the first film strip reel or film take-up device 50 and the second film strip reel or film take-up device 54 are mounted on the corresponding rotatable mounting member or pin 40.

When so configured, As illustrated in FIG. 8, a drive means D, including a motor and belt or suitable mechanism, rotates the rotatable mounting members or pins 40 rotating the corresponding first film strip reel or film take-up device 50 and the second film strip reel or film take-up device 54 thereby separating the first elongated strip of flexible material or film 18 and the second elongated strip of flexible material or film 20 allowing the food products 16 to drop or fall onto a conveyor, dish, or other surface (not shown).

The preferred angle for redirecting the first elongated strip of flexible material or film 18 and the second elongated strip of flexible material or film 20 is at least 170 degrees. However, it is contemplated that at least either the first elongated strip of flexible material or film 18 and the second elongated strip of flexible material or film 20 is redirected at least about 90 degrees.

Figure 9:
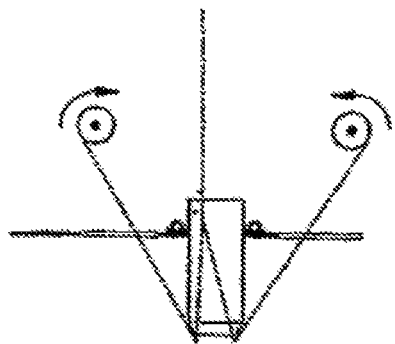
FIGS. 9 through 11 schematically depict different dispositions of the film strip take-up devices relative to the food strip directional control.
Figure 10:
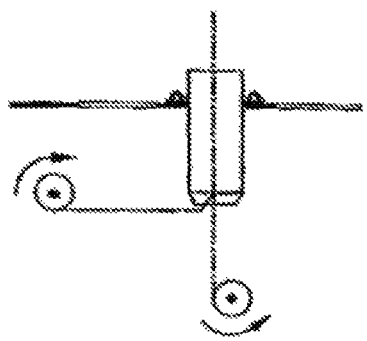
Figure 11:
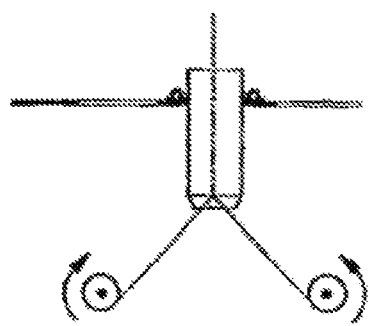

FIGS. 9 through 11 illustrate different examples of redirecting the first elongated strip of flexible material or film 18 and the second elongated strip of flexible material or film 20.

FIG. 9 illustrates both films being redirected to form a redirect angle greater than 90 degrees but less than 360 degrees.

FIG. 10 illustrates only one film being redirected to form a redirect angle of approximately 90 degrees.

FIG. 11 illustrates both films being redirected to form a redirect angle of approximately 90 degrees.

As illustrated in FIGS. 4 and 7, the food strip directional control 58 of the food dispensing assembly 14 are formed on the lower portions of side walls 70 that are partially disposed in the centrally disposed laminated strip opening 46 with an assembly support member 68 attached or formed on opposite side walls 70 to engage the upper surface 71 of the substantially horizontally disposed lower wall 48 of the food dispensing assembly support housing 38 on opposite sides of the centrally disposed laminated strip opening 46. Each assembly support member 68 may be disposed between a corresponding pair of retention members each indicated as 67 to cooperatively form an assembly support member receiving channel 69.

Outer end portions of the first elongated strip of flexible material or film 18 and the second elongated strip of flexible material or film 20 are attached or coupled to the first film strip reel or film take-up device 50 and the second film strip reel or film take-up device 54 respectively by an adhesive or through a film slot 72 described hereinafter when deployed.

The first film strip reel or film take-up device 50 and the second film strip reel or film take-up device 54 each comprises a spool 74 including a film strip cross-member 76 to receive the first elongated strip of flexible material or film 18 or the second elongated strip of flexible material or film 20 of the continuous laminated food strip 22 having a film retainer element or member 78 disposed on opposite end portions thereof to retain the first elongated strip of flexible material or film 18 or the second elongated strip of flexible material or film 20 of the continuous laminated food strip 22 thereon during the separation process.

Each film strip cross-member 76 may include the film slot 72 to receive the outer portion of the corresponding first elongated strip of flexible material or film 18 or second elongated strip of flexible material or film 20.

When the food handling system 10 is stored or refrigerated, each film strip cross-member 76 is disposed within the corresponding groove or channel 36 of the corresponding food dispensing assembly support member 32.

The continuous laminated food strip 22, disposed in the food storage assembly 12, is placed in the cold storage.

As previously described, the food dispensing assembly 14 may be at least partially stored with the food storage assembly 12, the food dispensing assembly 14 is disposed at the lower portion of the hollow food product storage enclosure or carton 24. The outer-end portions of the laminated food strips 18 and 20 are connected or coupled to the film take-up devices 50 and 54.

When the first elongated strip of flexible material or film 18 and the second elongated strip of flexible material or film 20 of the continuous laminated food strip 22 is reversed backwards at an angle over the first directional control surface 64 and second directional control surface 66 respectively the first elongated strip of flexible material or film 18 and the second elongated strip of flexible material or film 20 of the continuous laminated food strip 22 are separated allowing the food products 16 to separate from the film of the continuous laminated food strip 22.

This results in unpackaging of the food products 16 from the laminated food strip 22. As this delamination takes place, the delamination food product 16 passes onto the conveyor belt or other receiving surface (not shown).

Thus, delaminated/unpackaged food products 16 under aseptic conditions may be fed to a grill or conveyor oven or any other heat source directly for the purpose of cooking, without the food being even touched by the cooking staff.

Figure 12:
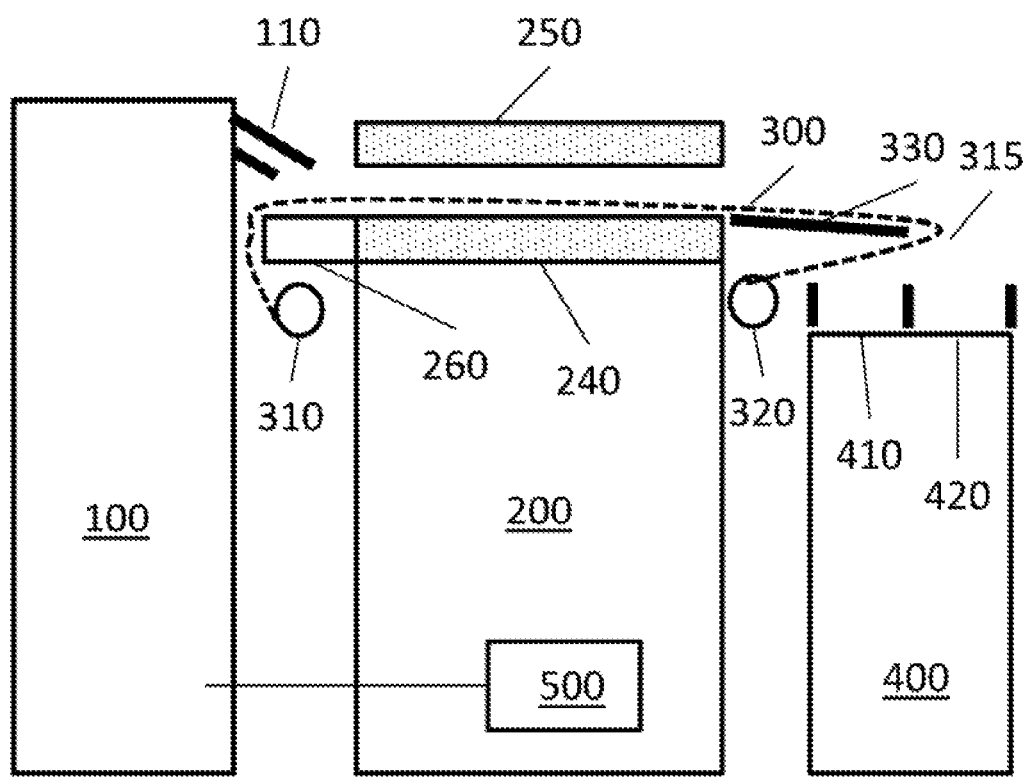
FIG. 12 illustrates an automated grill system diverting a cooked product to a first receiving area.

An automated grill system, as illustrated in FIG. 12, includes a food product dispensing system 100 for dispensing uncooked food product; a dual-sided grill system 200 for cooking the uncooked food product; a staging system 400 for receiving cooked food product; and a non-continuous indexed conveyor belt 300 for conveying the uncooked food product from the food product dispensing system 100 to the dual-sided grill system 200 and for conveying the cooked food product from the dual-sided grill system 200 to the staging system 400. The dual-sided grill system is a clam shell grill system including a lower cooking platen 240 and an upper cooking platen 250.

The dual-sided grill system may include independently temperature controlled cooking areas.

As illustrated in FIG. 12, non-continuous indexed conveyor belt 300 transverses between the lower cooking platen 240 and the upper cooking platen 250. The upper platen 250 of the dual-sided grill system is in an open position when not cooking food product such that the upper platen 250 does not engage food product and does not engage the non-continuous indexed conveyor belt 300.

The staging system 400 has multiple staging areas (410 and 420), each staging area (410 and 420) receives cooked food product. It is noted that the staging areas can receive diverse or different cooked food product.

Figure 13:
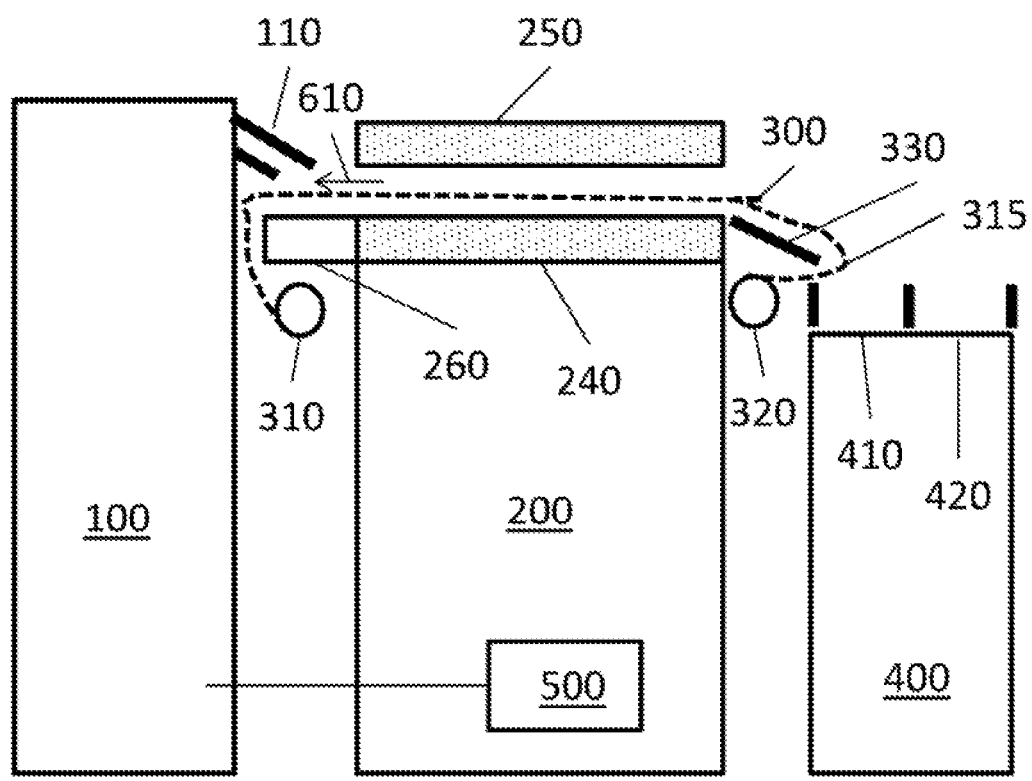
FIG. 13 illustrates an automated grill system diverting a cooked product to a second receiving area.
Figure 15:
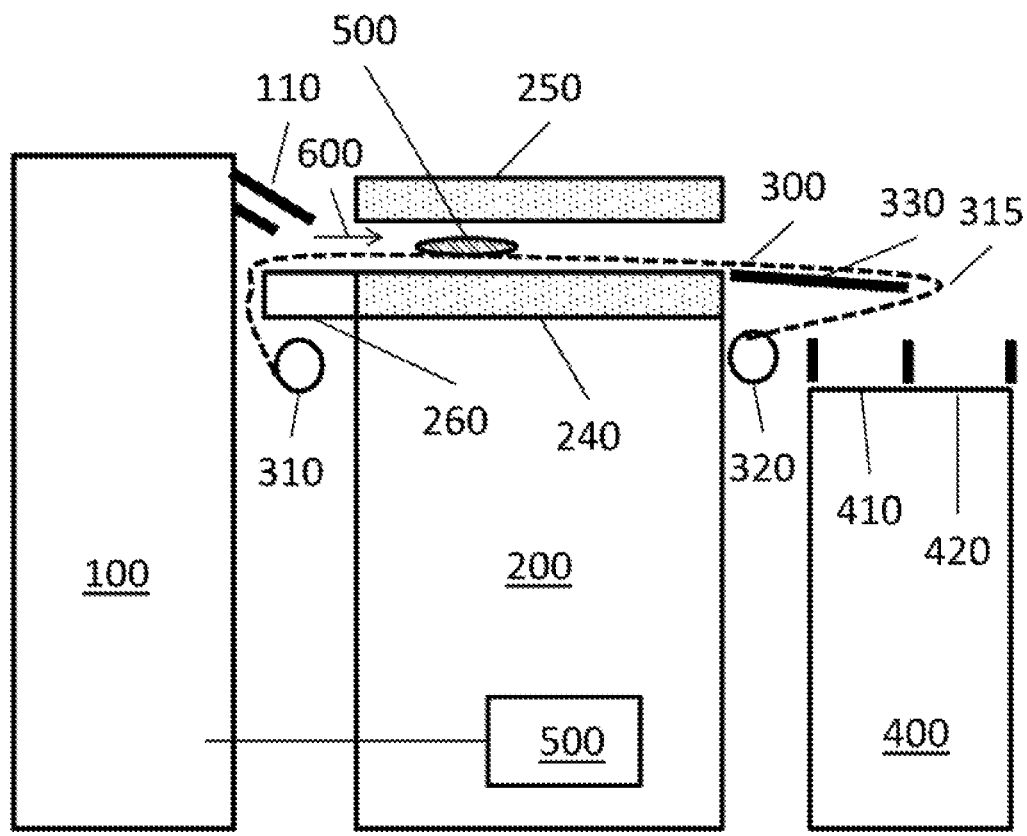
FIG. 15 illustrates an automated grill system cooking the uncooked product of FIG. 14.
Figure 16:
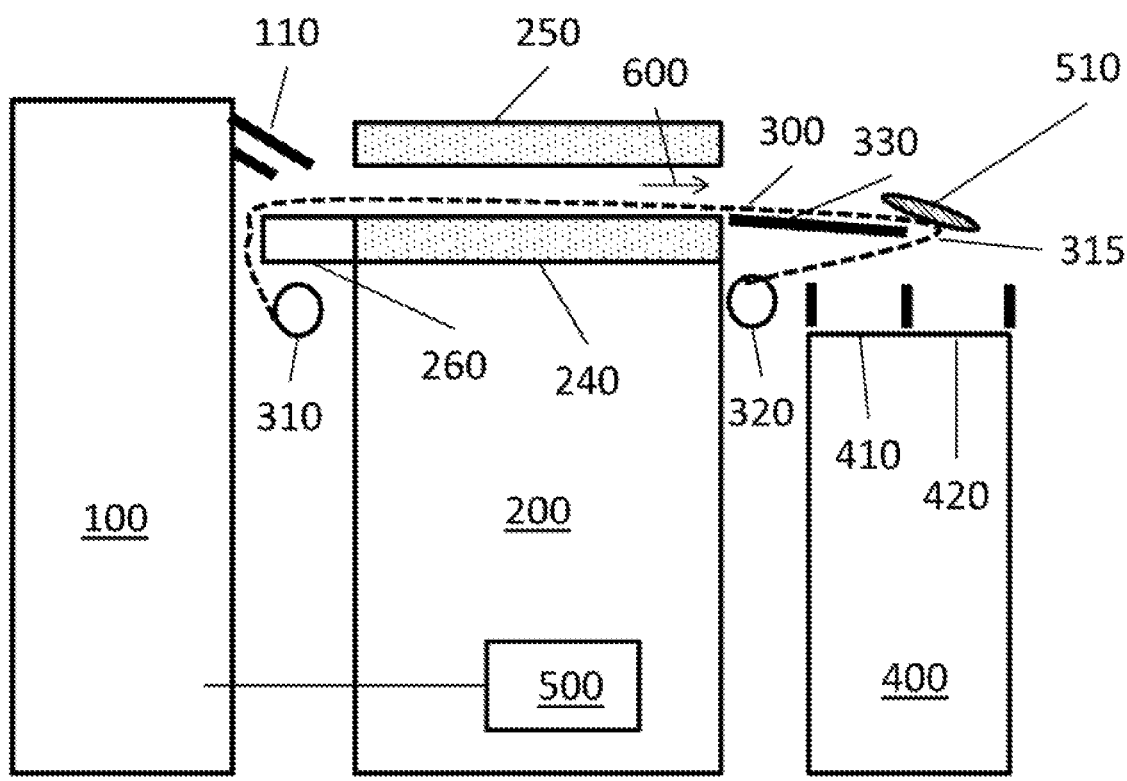
FIG. 16 illustrates an automated grill system diverting the cooked product of FIG. 15 to the first receiving area.

The non-continuous indexed conveyor belt 300 moves in a first direction 600, as illustrated in FIG. 15, when the non-continuous indexed conveyor belt 300 conveys the uncooked food product 500 from the food product dispensing system 100 to the dual-sided grill system 200 and conveys, as illustrated in FIG. 16, the cooked food product 500 from the dual-sided grill system 200 to the staging system 400. The non-continuous indexed conveyor belt 300 moves in a second direction 610 (as illustrated in FIG. 13)

when the non-continuous indexed conveyor belt is being reset. The first direction 600 and the second direction 610 are different directions.

The non-continuous indexed conveyor belt 300 includes a first driver 320 for moving the non-continuous indexed conveyor belt 300 in the first direction 600 and a second driver 310 for moving the non-continuous indexed conveyor belt 300 in a second direction 610.

The automated grill system includes a controller 500 for controlling the movement of the non-continuous indexed conveyor belt 300. The controller 500 causes the non-continuous indexed conveyor belt 300 to move a first distance when the food product dispensing system 100 dispenses uncooked food product onto the non-continuous indexed conveyor belt 300.

The controller 500 controls the non-continuous indexed conveyor belt 300 to move a second distance when the non-continuous indexed conveyor belt 300 conveys the uncooked food product from the food product dispensing system to the dual-sided grill system.

The controller 500 controls the non-continuous indexed conveyor belt 300 to move a third distance when the non-continuous indexed conveyor belt 300 conveys the cooked food product from the dual-sided grill system 200 to the staging system 400.

The controller 500 controls non-continuous indexed conveyor belt 300 to move a fourth distance when the non-continuous indexed conveyor belt 300 is being reset.

The non-continuous indexed conveyor belt 300 may include cooking areas and non-cooking areas.

The automated grill system may include a non-continuous indexed conveyor belt cleaning system (not shown) for cleaning residual food product and cooking by-product from the non-continuous indexed conveyor belt.

Alternatively, the conveyer belt may be a continuous indexed conveyor belt for conveying the uncooked food product from the food product dispensing system to the dual-sided grill system and for conveying the cooked food product from the dual-sided grill system to the staging system.

As illustrated in FIG. 12, the automated grill system includes a receiving area 260, located between the food product dispensing system 100 and the dual-sided grill system 200, for receiving the dispensed uncooked food product. The conveyor belt 300 conveys the uncooked food product from the receiving area 260 to the dual-sided grill system 200.

The receiving area 260 allows the uncooked food product to be properly staged prior to cooking without having the uncooked food product from being dispensed directly from the food product dispensing system 100 onto the dual-sided grill system 200.

As illustrated in FIG. 12, the automated grill system includes a diverting system 330 for moving an output edge 315 of the conveyor belt 300 between a first position, as illustrated in FIG. 12, and a second position, as illustrated in FIG. 13. The first position, as illustrated in FIG. 12, corresponds to the first staging area 420 to allow the first staging area 420 to receive cooked food product. The second position, as illustrated in FIG. 13, corresponds to the second staging area 410 to allow the second staging area 410 to receive cooked food product.

Figure 14:
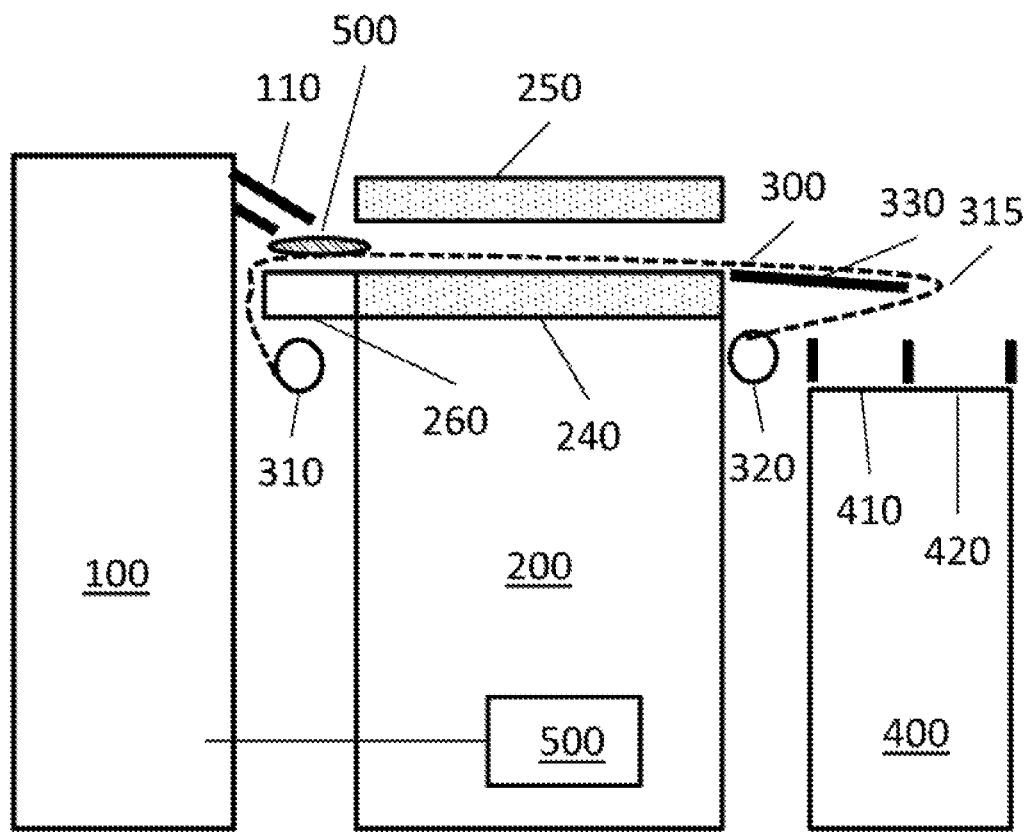
FIG. 14 illustrates an automated grill system receiving uncooked product from a food product delaminator.

FIG. 14 illustrates the dispensing of uncooked food product 500 from the food product dispensing system 100 onto the receiving area 260.

FIG. 15 illustrates the conveying of the uncooked food product 500 from the receiving area 260 to the dual-sided grill system 200.

FIG. 16 illustrates the conveying of cooked food product 510 from the dual-sided grill system 200 to the first staging area 420 of the staging system 400.

It is noted that although the above embodiments discuss a lever or flapper diverter mechanism that moves the output edge of the conveyor belt to enable the depositing the cooked food at different staging, the diverting mechanism may comprise a mechanism that moves the entire conveyor belt bi-directionality, in a horizontal direction, so that the output edge of the conveyor belt is positioned over the appropriate staging area. In this embodiment, the conveyor belt is part of a single unit that can move bi-directionally, in a horizontal direction, between the receiving area and the staging areas.

It is further noted that although the above embodiments discuss a lever or flapper diverter mechanism that moves the output edge of the conveyor belt to enable the depositing the cooked food at different staging, the diverting mechanism may comprise a mechanism that moves the first driver bi-directionally, in a horizontal direction, so that the output edge of the conveyor belt is positioned over the appropriate staging area. In this embodiment, the first driver moves bi-directionally, in a horizontal direction, so that the output edge of the conveyor belt is positioned over the appropriate staging area.

It is additionally noted that although the above embodiments discuss a lever or flapper diverter mechanism that moves the output edge of the conveyor belt to enable the depositing the cooked food at different staging, the diverting mechanism may comprise a mechanism that comprises 2 or more belts, which can be moved bi-directionally, in a horizontal direction, so that the output edge of the conveyor belt is positioned over the appropriate staging area. In this embodiment, the conveyor belts are part of a single unit that can move bi-directionally, in a horizontal direction, between the receiving area and the staging areas.

An automated grill system includes a food product dispensing system for dispensing uncooked food product; a dual-sided grill system for cooking the uncooked food product; a staging system for receiving cooked food product; and a non-continuous indexed conveyor belt for conveying the uncooked food product from the food product dispensing system to the dual-sided grill system and for conveying the cooked food product from the dual-sided grill system to the staging system.

An automated grill system includes a food product dispensing system for dispensing uncooked food product; a dual-sided grill system for cooking the uncooked food product; a staging system for receiving cooked food product; and a continuous indexed conveyor belt for conveying the uncooked food product from the food product dispensing system to the dual-sided grill system and for conveying the cooked food product from the dual-sided grill system to the staging system.

An automated grill system includes a food product dispensing system for dispensing uncooked food product; a dual-sided grill system for cooking the uncooked food product; a receiving area, located between the food product dispensing system and the dual-sided grill system, for receiving the dispensed uncooked food product; a staging system for receiving cooked food product; and a conveyor belt for conveying the uncooked food product from the receiving area to the dual-sided grill system and for conveying the cooked food product from the dual-sided grill system to the staging system.

An automated grill system includes a food product dispensing system for dispensing uncooked food product; a dual-sided grill system for cooking the uncooked food product; a staging system for receiving cooked food product; the staging system having a first staging area and a second staging area, the first staging area and the second staging area staging area receiving cooked food product; a conveyor belt for conveying the uncooked food product from the food product dispensing system to the dual-sided grill system and for conveying the cooked food product from the dual-sided grill system to the staging system; and a diverting system for moving an output edge of the conveyor belt between a first position and a second position, the first position corresponding to the first staging area to allow the first staging area to receive cooked food product, the second position corresponding to the second staging area to allow the second staging area to receive cooked food product.

Figure 17:
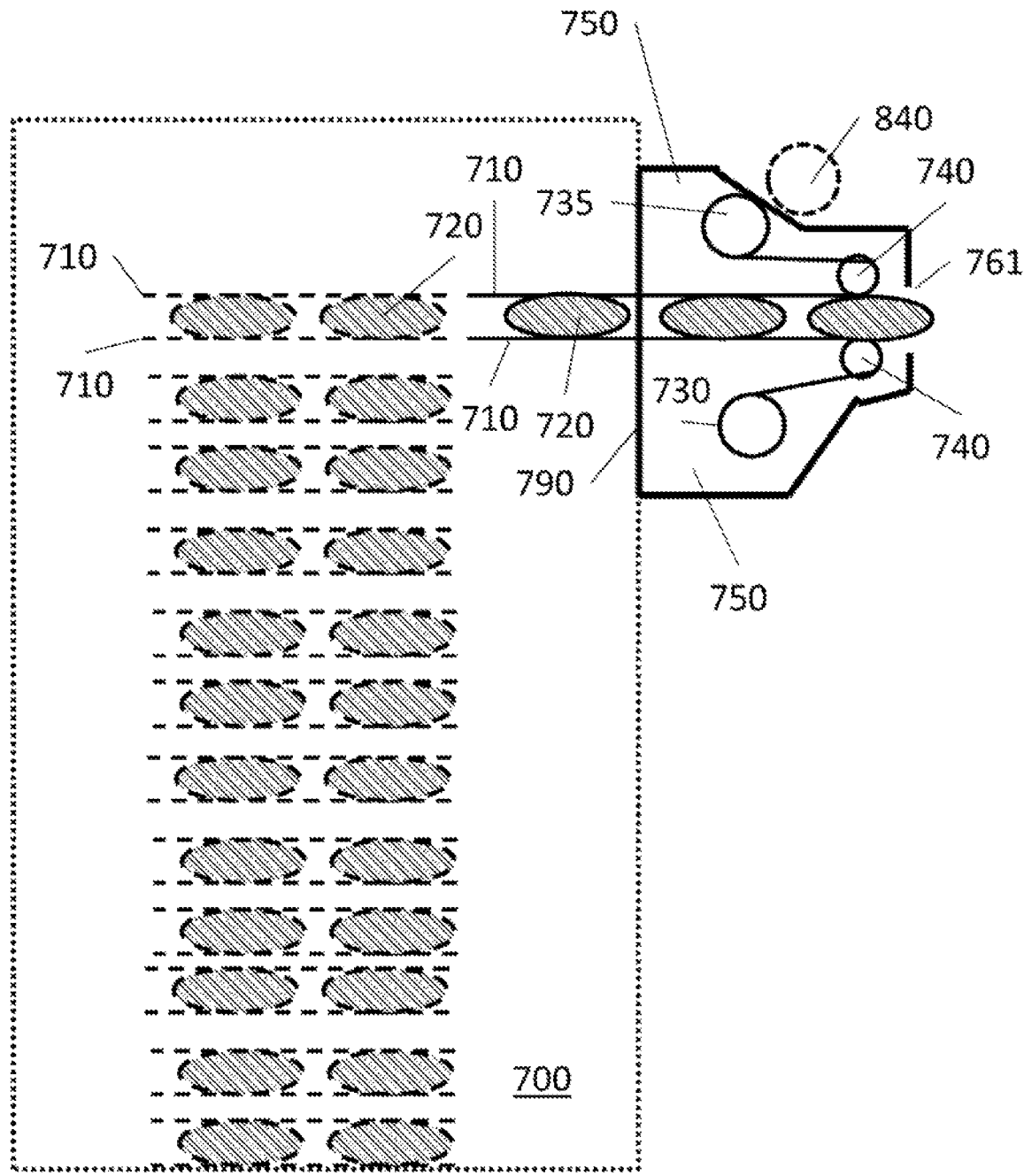
FIG. 17 illustrates a food dispensing module for a delaminating food dispensing system.

FIG. 17 illustrates a food dispensing module 700 for a delaminating food dispensing system, as described above. As illustrated in FIG. 17, the food dispensing module 700 houses food product 720, the food product 720 having been pre-laminated by two films 710. The food dispensing module 700 also includes a delaminating housing 790.

As the food product 720 is dispensed from the food dispensing module 700, the food product 720 is delaminated, within the delaminating housing 790, from the two films 710 by delaminating nips 740. The delaminated food product 725 exits the food dispensing module 700.

The delaminating process is driven by a first film take-up roller 735, located within the delaminating housing 790, and a second take-up roller 730, located within the delaminating housing 790. Each take-up roller includes a drive gear (not shown), which mechanically rotates the take-up rollers.

Each take-up roller, upon rotation, rolls one of the films upon itself, driving the laminated food product 720 from its storage location to a location 761 for being dispensed from the food dispensing module 700.

As illustrated in FIG. 17, the first film take-up roller 735 is operatively engaged to a drive mechanism 840 so that the drive mechanism 840 can control the rotation of the first film take-up roller 735 via its associated drive gear. In the embodiment of FIG. 17, the drive gear of the first film take-up roller 735 is mechanically linked to the drive gear of the second take-up roller 730 such that when the drive gear of the first film take-up roller 735 rotates the drive gear of the second take-up roller 730 rotates.

To facilitate the operative engagement of the first film take-up roller 735 with the drive mechanism 840, a portion of the drive gear of the first film take-up roller 735 is located outside the housing of the food dispensing module 700, thereby exposing a portion of the drive gear to the drive mechanism 840.

Alternatively, the second take-up roller 730 may be operatively engaged to the drive mechanism 840 so that the drive mechanism 840 can control the rotation of the second film take-up roller 730 via its associated drive gear. To facilitate the operative engagement of the second film take-up roller 730 with the drive mechanism 840, a portion of the drive gear of the second film take-up roller 730 would be located outside the housing of the food dispensing module 700, thereby exposing a portion of the drive gear to the drive mechanism 840.

As illustrated in FIG. 17, each take-up roller includes an associated trap void 750 which collects residual food product, such as blood, etc. Having a trap void 750 associated with each take-up roller allows flexibility in the orientation of the food dispensing module 700 within the delaminating food dispensing system.

Alternatively, the food dispensing module 700 may only include a single trap void which collects residual food product, such as blood, etc.

Figure 18:
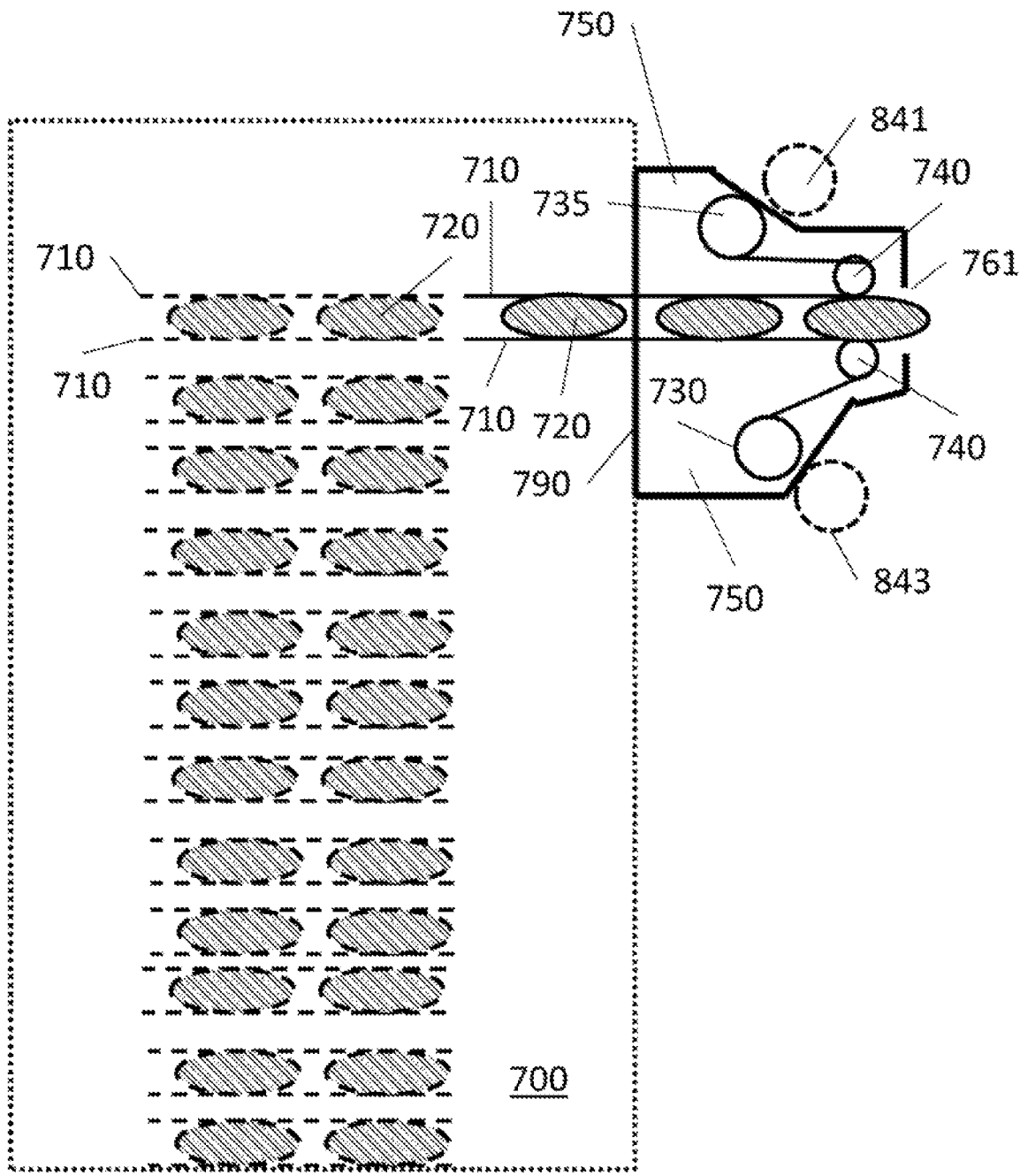
FIG. 18 illustrates another view of the food dispensing module for a delaminating food dispensing system of FIG. 17.

FIG. 18 illustrates another view of the food dispensing module for a delaminating food dispensing system of FIG. 17. As illustrated in FIG. 18, the delaminating process is driven by a first film take-up roller and a second take-up roller.

The first take-up roller includes a drive gear 841, which mechanically rotates the first take-up rollers of FIG. 17. The second take-up roller includes a drive gear 843, which mechanically rotates the second take-up rollers of FIG. 17.

Each take-up roller, upon rotation, rolls one of the films upon itself, driving the laminated food product from its storage location to a location for being dispensed from the food dispensing module 700 from an opening 761.

As illustrated in FIG. 18, the drive gear 841 is operatively engaged to a drive mechanism so that the drive mechanism can control the rotation of the first film take-up roller via its associated drive gear 841.

In the embodiment of FIG. 18, the drive gear 841 of the first film take-up roller is mechanically linked to the drive gear 843 of the second take-up roller such that when the drive gear 841 of the first film take-up roller rotates the drive gear 843 of the second take-up roller rotates.

To facilitate the operative engagement of the drive gear 841 with the drive mechanism (not shown), a portion of the drive gear 841 of the first film take-up roller may be located outside the housing of the food dispensing module 700, thereby exposing a portion of the drive gear 841 to the drive mechanism.

Alternatively, the second take-up roller may be operatively engaged to a drive mechanism so that the drive mechanism can control the rotation of the second film take-up roller via its associated drive gear 843. To facilitate the operative engagement of the second film take-up roller with the drive mechanism, a portion of the drive gear 843 of the second film take-up roller would be located outside the housing of the food dispensing module 700, thereby exposing a portion of the drive gear 843 to the drive mechanism.

It is noted that the drive mechanism associated with the drive gear 843 may be driven independently of the drive mechanism associated with the drive gear 841.

As illustrated in FIG. 18, each take-up roller includes an associated trap void 750 which collects residual food product, such as blood, etc. Having a trap void 750 associated with each take-up roller allows flexibility in the orientation of the food dispensing module 700 within the delaminating food dispensing system.

Alternatively, the food dispensing module 700 may only include a single trap void which collects residual food product, such as blood, etc.

Figure 19:
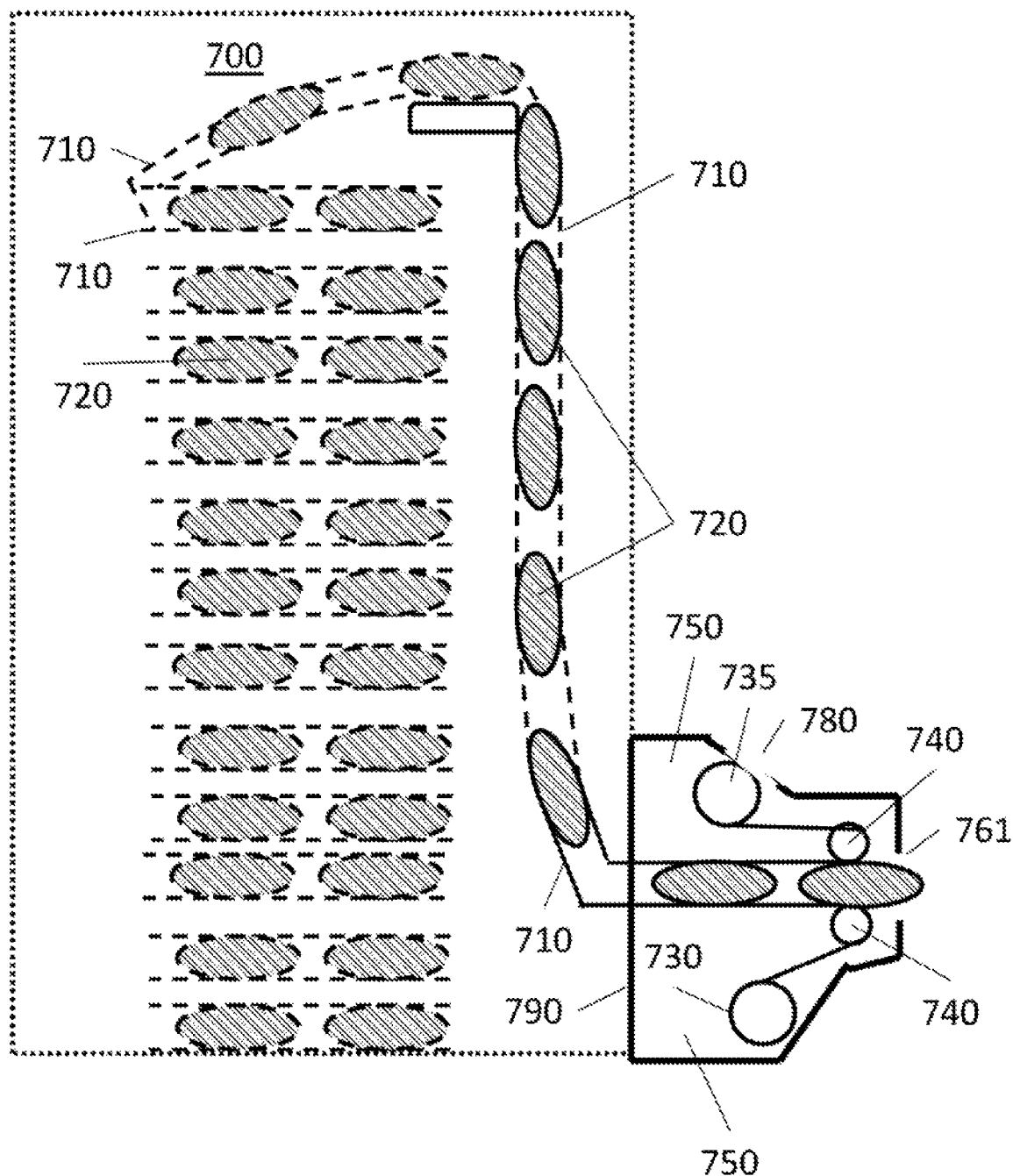
FIG. 19 illustrates a bottom dispensing food dispensing module for a delaminating food dispensing system.

FIG. 19 illustrates a bottom dispensing food dispensing module for a delaminating food dispensing system. As illustrated in FIG. 19, the housing of the food dispensing module 700 shows that the dispensing output member 790 (for dispensing delaminated food product 720) is located at the bottom of the food dispensing module 700. The housing of the dispensing output member 790 shows that an opening 780 is provided to enable the operative engagement of between a drive gear of a take-up roller and a drive mechanism.

Although, in FIG. 19, the opening 780 is illustrated at the top of the dispensing output member 790, it can alternatively be located at the bottom of the dispensing output member 790.

Figure 20:
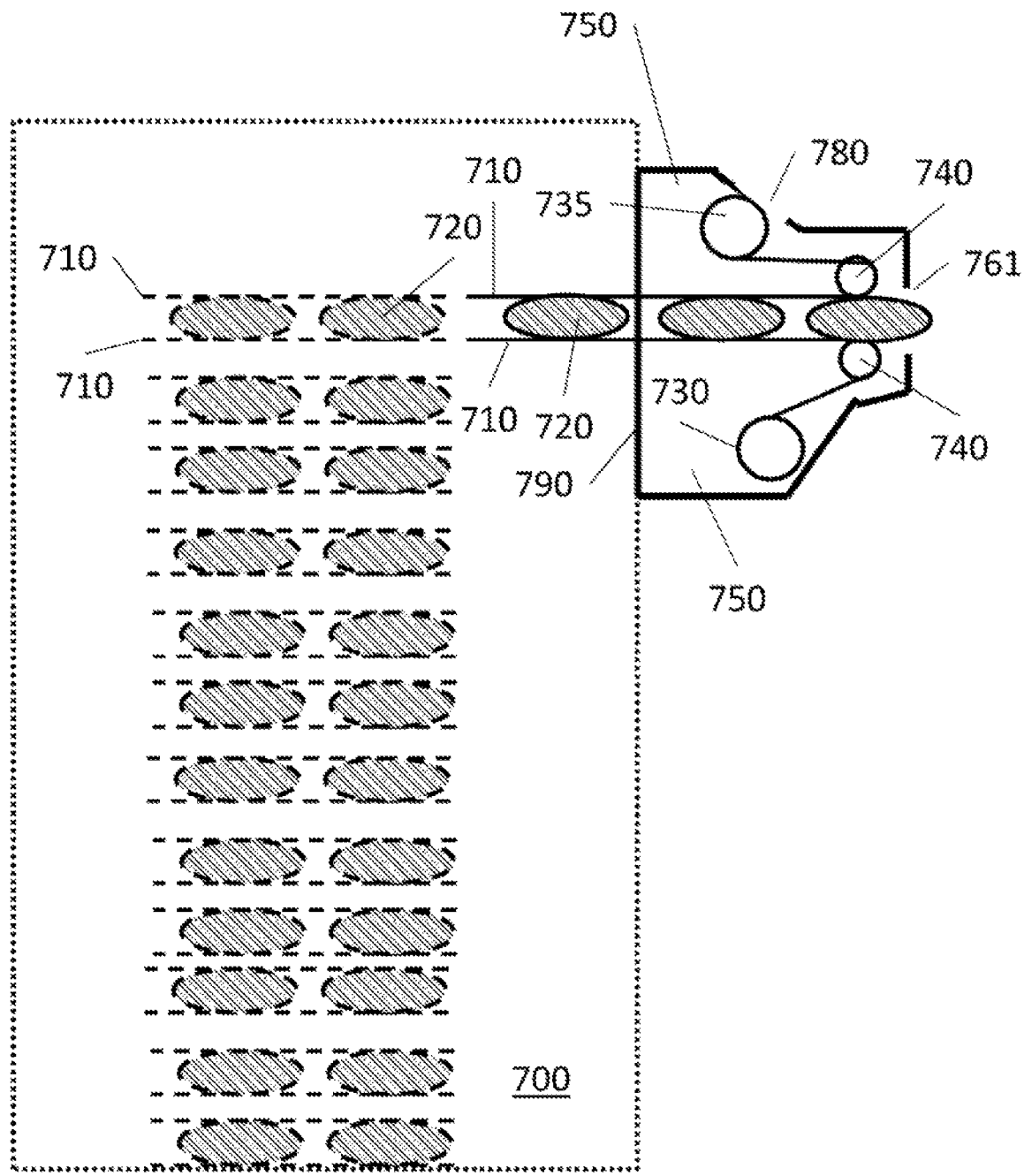
FIG. 20 illustrates a top dispensing food dispensing module for a delaminating food dispensing system.

FIG. 20 illustrates a top dispensing food dispensing module for a delaminating food dispensing system. As illustrated in FIG. 20, the housing of the food dispensing module 700 shows that the dispensing output member 790 (for dispensing delaminated food product 720) of the dispensing food dispensing module 790 is located at the top of the food dispensing module 700.

The housing of the dispensing food dispensing module 790 shows that an opening 780 is provided to enable the operative engagement of between a drive gear of a take-up roller and a drive mechanism.

Although, in FIG. 20, the opening 780 is illustrated at the top of the dispensing output member 790, it can alternatively be located at the bottom of the dispensing output member 790.

Figure 21:
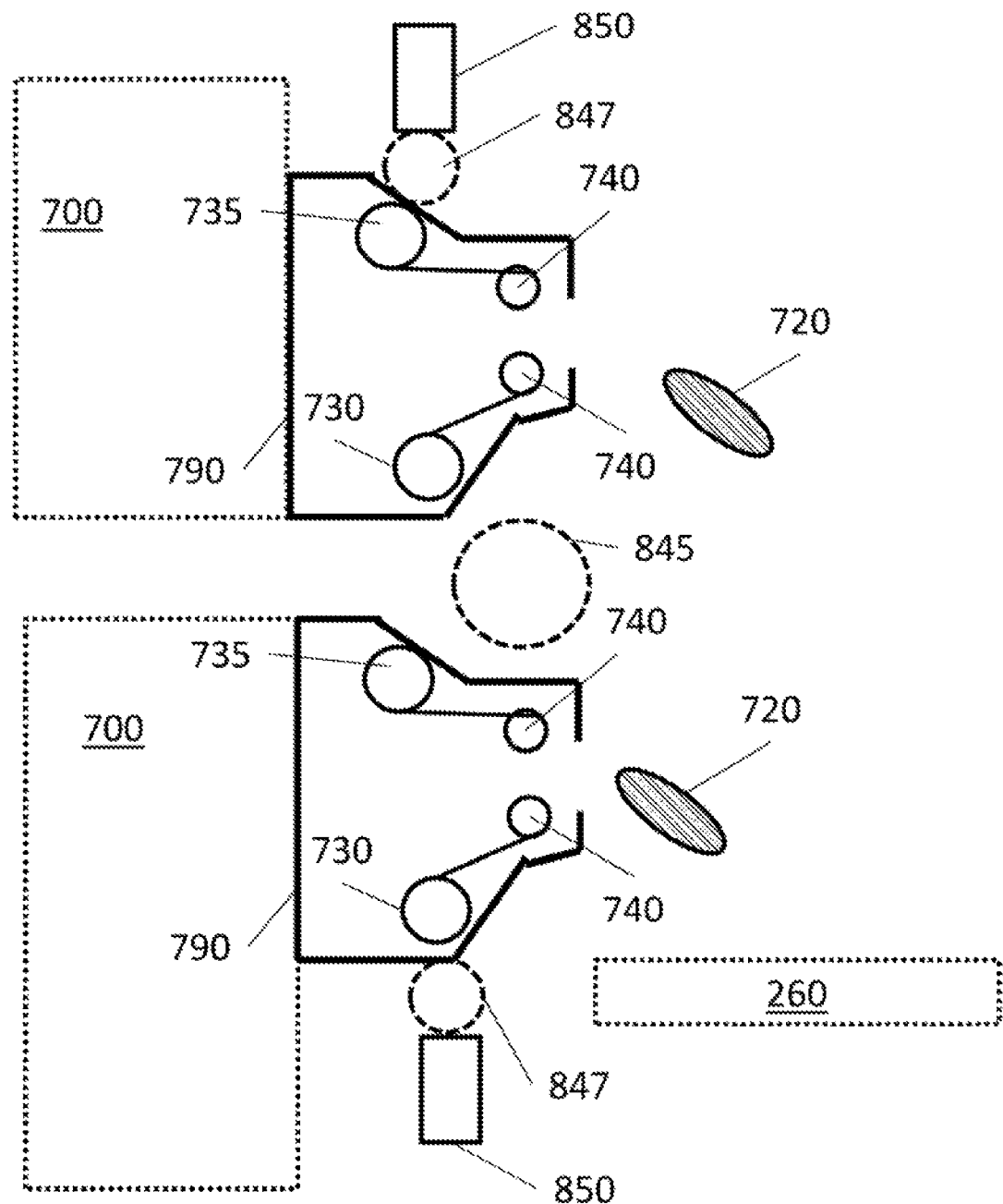
FIG. 21 illustrates dual dispensing food dispensing modules for a delaminating food dispensing system.

FIG. 21 illustrates dual dispensing food dispensing modules for a delaminating food dispensing system, wherein one food dispensing module is located above the other food dispensing module. As illustrated in FIG. 21, each food dispensing module 700 engages a drive mechanism 847 that is driven by an associated motor 850.

It is noted that the drive mechanisms and associated motors can be operated independently or dependently.

As illustrated in FIG. 21, the drive mechanism 847 for the top food dispensing module is located above the associated delaminating unit 790, and the drive mechanism 840 for the bottom food dispensing module is located below the associated delaminating unit 790.

It is noted that a drive mechanism 845, alternatively, may be located between the delaminating units 790 such that the drive mechanism 845 for the top food dispensing module 700 is located below the associated delaminating unit 790 and the drive mechanism 845 for the bottom food dispensing module 700 is located above the associated delaminating unit 790.

The dual dispensing food dispensing modules dispense delaminated food product 720 onto a receiving area 260.

As previously noted the dispensing of the delaminated food product 725 from the top food dispensing module may be independent of the dispensing of the delaminated food product 725 from the bottom food dispensing module.

Figure 22:
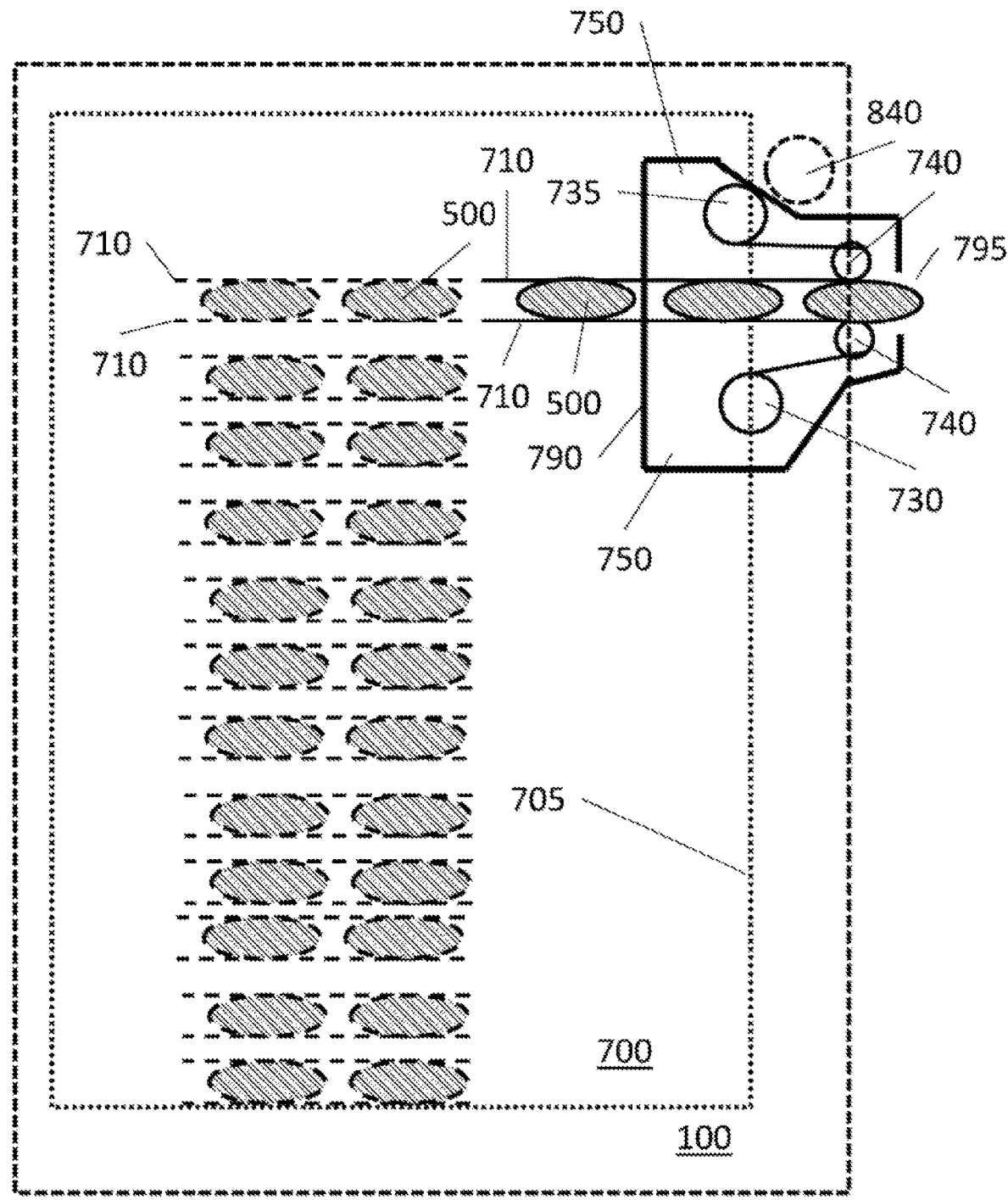
FIG. 22 illustrates a food dispensing module within a delaminating food dispensing system.

FIG. 22 illustrates a food dispensing module within a delaminating food dispensing system. As illustrated in FIG. 22, a food dispensing module 700 for a delaminating food dispensing system 100 includes an outer housing 705 and a delaminating housing 790. The delaminating housing 790 has a first portion which is located within the outer housing 705 and a second portion located outside the outer housing 705.

The delaminating housing 790 includes delaminating nips 740 for delaminating the food product 500 from the films 710 prior to dispensing. To facilitate the delamination process, the delaminating housing 790 includes a first film take-up roller 735 and a second film take-up roller 730. The first film take-up roller 735 and second film take-up roller 730 take-up the film 710, thereby pulling the film by delaminating nips 740 to delaminate the food product 500 from the films 710 prior to dispensing the food product 500 through output opening 795.

As illustrated in FIG. 22, each take-up roller includes an associated trap void 750 which collects residual food product, such as blood, etc. Having a trap void 750 associated with each take-up roller allows flexibility in the orientation of the food dispensing module 700 within the delaminating food dispensing system.

Moreover, as illustrated in FIG. 22, the output opening 795 is located in the second portion of the delaminating housing 790.

The first film take-up roller 735 includes a first drive gear (not shown) and the second film take-up roller 730 includes a second drive gear (not shown).

It is noted that the first drive gear may be mechanically linked to the second drive gear such that when the first drive gear rotates the second drive gear rotates.

A portion of the first drive gear is located outside the delaminating housing 790 and outside the outer housing 705 to engage drive mechanism 840.

It is noted that a portion of the second drive gear may be located outside the delaminating housing 790 and outside the outer housing 705 to engage drive mechanism 840.

The delaminating housing 790 may be detachably attached to the outer housing 705.

The outer housing 705 may be constructed of bio-degradable material or disposable material.

It is further noted that the delaminating housing 790 and its various elements (first film take-up roller 735, second film take-up roller 730, delaminating nips 740, and drive gears) may, after use, be properly cleaned and sanitized and reused in a new food dispensing module.

It is noted that the delaminating food dispensing system 100 may include tracks, rails, grooves, etc. (not shown) that physically engage the food dispensing module 700 to guide the food dispensing module 700 into its proper location within the delaminating food dispensing system 100 so that the drive gears can operatively engage the drive mechanism 840.

It is further noted that the food dispensing module 700 may include tracks, rails, grooves, etc. (not shown) that physically engage the delaminating food dispensing system 100 to guide the food dispensing module 700 into its proper location within the delaminating food dispensing system 100 so that the drive gears can operatively engage the drive mechanism 840.

Figure 23:
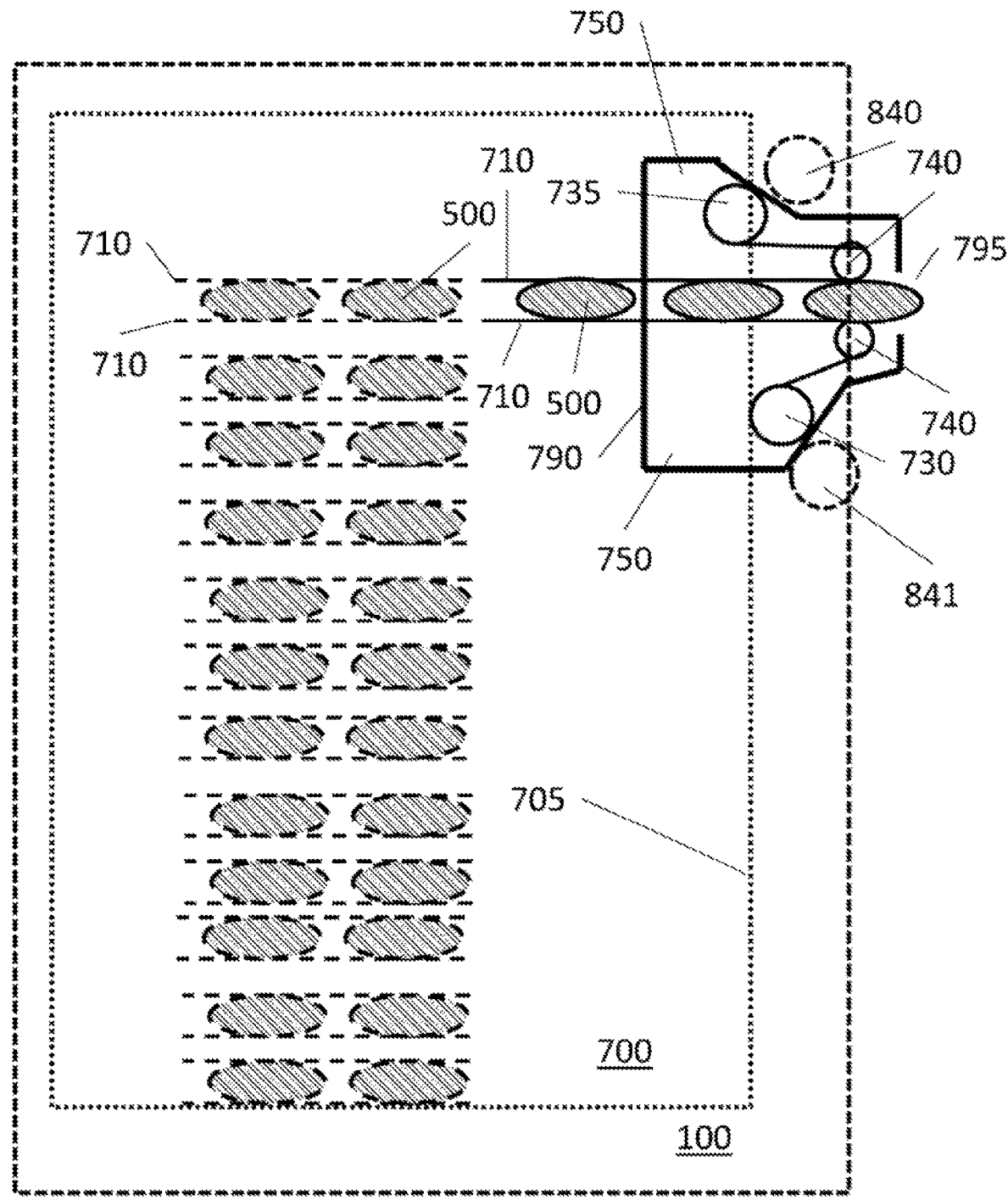
FIG. 23 illustrates another food dispensing module within a delaminating food dispensing system.

FIG. 23 illustrates another food dispensing module within a delaminating food dispensing system. As illustrated in FIG. 23, a food dispensing module 700 for a delaminating food dispensing system 100 includes an outer housing 705 and a delaminating housing 790. The delaminating housing 790 has a first portion which is located within the outer housing 705 and a second portion located outside the outer housing 705.

The delaminating housing 790 includes delaminating nips 740 for delaminating the food product 500 from the films 710 prior to dispensing. To facilitate the delamination process, the delaminating housing 790 includes a first film take-up roller 735 and a second film take-up roller 730.

The first film take-up roller 735 and second film take-up roller 730 take-up the film 710, thereby pulling the film by delaminating nips 740 to delaminate the food product 500 from the films 710 prior to dispensing the food product 500 through output opening 795.

As illustrated in FIG. 23, each take-up roller includes an associated trap void 750 which collects residual food product, such as blood, etc. Having a trap void 750 associated with each take-up roller allows flexibility in the orientation of the food dispensing module 700 within the delaminating food dispensing system.

Moreover, as illustrated in FIG. 23, the output opening 795 is located in the second portion of the delaminating housing 790.

The first film take-up roller 735 includes a first drive gear (not shown) and the second film take-up roller 730 includes a second drive gear (not shown).

A portion of the first drive gear is located outside the delaminating housing 790 and outside the outer housing 705 to engage a first drive mechanism 840.

It is noted that a portion of the second drive gear may be located outside the delaminating housing 790 and outside the outer housing 705 to engage a second drive mechanism 841.

The delaminating housing 790 may be detachably attached to the outer housing 705.

The outer housing 705 may be constructed of bio-degradable material or disposable material.

It is further noted that the delaminating housing 790 and its various elements (first film take-up roller 735, second film take-up roller 730, delaminating nips 740, and drive gears) may, after use, be properly cleaned and sanitized and reused in a new food dispensing module.

It is noted that the delaminating food dispensing system 100 may include tracks, rails, grooves, etc. (not shown) that physically engage the food dispensing module 700 to guide the food dispensing module 700 into its proper location within the delaminating food dispensing system 100 so that the drive gears can operatively engage the drive mechanisms (840 and 841).

It is further noted that the food dispensing module 700 may include tracks, rails, grooves, etc. (not shown) that physically engage the delaminating food dispensing system 100 to guide the food dispensing module 700 into its proper location within the delaminating food dispensing system 100 so that the drive gears can operatively engage the drive mechanisms (840 and 841).

In summary, a food dispensing module for a delaminating food dispensing system includes an outer housing; and a delaminating housing; the delaminating housing having a first portion being located within the outer housing and a second portion located outside the outer housing; the delaminating housing including delaminating nips, a first film take-up roller, a second film take-up roller, an output opening, and a trap void; the output opening being located in the second portion of the delaminating housing.

The first film take-up roller may include a first drive gear and the second film take-up roller includes a second drive gear.

The first drive gear may be mechanically linked to the second drive gear such that when the first drive gear rotates the second drive gear rotates.

A portion of the first drive gear may be located outside the delaminating housing and outside the outer housing.

The portion of the first drive gear may be located outside the delaminating housing and outside the outer housing operatively engages a driving mechanism.

The first drive gear may be mechanically linked to the second drive gear such that when the first drive gear rotates the second drive gear rotates.

A portion of the second drive gear may be located outside the delaminating housing and outside the outer housing.

The portion of the second drive gear may be located outside the delaminating housing and outside the outer housing operatively engages a driving mechanism.

A portion of the first drive gear may be located outside the delaminating housing and outside the outer housing and a portion of the second drive gear is located outside the delaminating housing and outside the outer housing.

The portion of the first drive gear may be located outside the delaminating housing and outside the outer housing operatively engages a driving mechanism and the portion of the second drive gear located outside the delaminating housing and outside the outer housing operatively engages the driving mechanism.

The portion of the first drive gear may be located outside the delaminating housing and outside the outer housing operatively engages a first driving mechanism and the portion of the second drive gear located outside the delaminating housing and outside the outer housing operatively engages a second driving mechanism.

The delaminating housing may be detachably attached to the outer housing.

The outer housing may include laminated food product.

The outer housing may be constructed of bio-degradable material.

The outer housing may be constructed of disposable material.

A delaminating food dispensing system includes a housing; a drive mechanism; a first food dispensing module; a second food dispensing module; a first food dispensing module opening; and a second food dispensing module opening; the first food dispensing module including a first food dispensing module outer housing, and a first food dispensing module delaminating housing; the first food dispensing module delaminating housing having a first portion being located within the first food dispensing module outer housing and a second portion located outside the first food dispensing module outer housing; the first food dispensing module delaminating housing including first food dispensing module delaminating nips, a first food dispensing module first film take-up roller, a first food dispensing module second film take-up roller, a first food dispensing module output opening, and a first food dispensing module trap void; the first food dispensing module output opening being located in the second portion of the first food dispensing module delaminating housing; the second food dispensing module including a second food dispensing module outer housing, and a second food dispensing module delaminating housing; the second food dispensing module delaminating housing having a first portion being located within the second food dispensing module outer housing and a second portion located outside the second food dispensing module outer housing; the second food dispensing module delaminating housing including second food dispensing module delaminating nips, a second food dispensing module first film take-up roller, a second food dispensing module second film take-up roller, a second food dispensing module output opening, and a second food dispensing module trap void; the second food dispensing module output opening being located in the second portion of the first food dispensing module delaminating housing.

The first food dispensing module may be located side-by-side with the second food dispensing module in the housing.

The first food dispensing module may be located above the second food dispensing module in the housing.

The first food dispensing module first film take-up roller may include a first drive gear; the first food dispensing module second film take-up roller including a second drive gear; the second food dispensing module first film take-up roller including a third drive gear; the second food dispensing module second film take-up roller including a fourth drive gear.

The first drive gear may be mechanically linked to the second drive gear such that when the first drive gear rotates the second drive gear rotates and the third drive gear is mechanically linked to the fourth drive gear such that when the third drive gear rotates the fourth drive gear rotates.

A portion of the first drive gear may be located outside the first food dispensing module delaminating housing and outside the first food dispensing module outer housing and a portion of the third drive gear is located outside the second food dispensing module delaminating housing and outside the second food dispensing module outer housing.

The portion of the first drive gear may be located outside the first food dispensing module delaminating housing and outside the first food dispensing module outer housing operatively engages the drive mechanism and the portion of the third drive gear located outside the second food dispensing module delaminating housing and outside the second food dispensing module outer housing operatively engages the drive mechanism.

A portion of the second drive gear may be located outside the first food dispensing module delaminating housing and outside the first food dispensing module outer housing and a portion of the fourth drive gear is located outside the second food dispensing module delaminating housing and outside the second food dispensing module outer housing.

The portion of the second drive gear may be located outside the first food dispensing module delaminating housing and outside the first food dispensing module outer housing operatively engages the drive mechanism and the portion of the fourth drive gear located outside the second food dispensing module delaminating housing and outside the second food dispensing module outer housing operatively engages the drive mechanism.

A portion of the first drive gear may be located outside the first food dispensing module delaminating housing and outside the first food dispensing module outer housing; a portion of the third drive gear may be located outside the second food dispensing module delaminating housing and outside the second food dispensing module outer housing; a portion of the second drive gear may be located outside the first food dispensing module delaminating housing and outside the first food dispensing module outer housing; and a portion of the fourth drive gear may be located outside the second food dispensing module delaminating housing and outside the second food dispensing module outer housing.

The portion of the first drive gear may be located outside the first food dispensing module delaminating housing and outside the first food dispensing module outer housing operatively engages the drive mechanism; the portion of the third drive gear located outside the second food dispensing module delaminating housing and outside the second food dispensing module outer housing operatively engaging the drive mechanism; the portion of the second drive gear located outside the first food dispensing module delaminating housing and outside the first food dispensing module outer housing operatively engaging the drive mechanism; and the portion of the fourth drive gear located outside the second food dispensing module delaminating housing and outside the second food dispensing module outer housing operatively engaging the drive mechanism.

The first food dispensing module delaminating housing may be detachably attached to the first food dispensing module outer housing and the second food dispensing module delaminating housing is detachably attached to the second food dispensing module outer housing.

The first food dispensing module outer housing may include laminated food product and the second food dispensing module outer housing may include laminated food product.

The first food dispensing module outer housing may be constructed of bio-degradable material and the second food dispensing module outer housing is constructed of bio-degradable material.

The first food dispensing module outer housing may be constructed of disposable material and the second food dispensing module outer housing is constructed of disposable material.

A food module for a food dispensing module used in a delaminating food dispensing system includes a first film having a first portion and a second portion; a second film having a first portion and a second portion; food product; a delaminating housing; a first delaminating nip; a second delaminating nip; a first film take-up roller; a second film take-up roller; an output opening; and a trap void; the food product being laminated between the first portion of the first film and the first portion of the second film; the second portion of the first film being detachably attached to the first film take-up roller; the second portion of the first film engaging the first delaminating nip; the second portion of the second film being detachably attached to the second film take-up roller; the second portion of the second film engaging the second delaminating nip.

The first film take-up roller may include a first drive gear and the second film take-up roller includes a second drive gear.

The first drive gear may be mechanically linked to the second drive gear such that when the first drive gear rotates the second drive gear rotates.

A portion of the first drive gear may be located outside the delaminating housing.

The portion of the first drive gear may be located outside the delaminating housing engages a driving mechanism.

The first drive gear may be mechanically linked to the second drive gear such that when the first drive gear rotates the second drive gear rotates.

A portion of the second drive gear may be located outside the delaminating housing.

The portion of the second drive gear may be located outside the delaminating housing engages a driving mechanism.

A portion of the first drive gear may be located outside the delaminating housing and a portion of the second drive gear is located outside the delaminating housing.

The portion of the first drive gear may be located outside the delaminating housing operatively engages a driving mechanism and the portion of the second drive gear located outside the delaminating housing operatively engages the driving mechanism.

The portion of the first drive gear may be located outside the delaminating housing operatively engages a first driving mechanism and the portion of the second drive gear located outside the delaminating housing operatively engages a second driving mechanism.

A delaminating food module includes a housing; a first delaminating nip; a second delaminating nip; a first film take-up roller; a second film take-up roller; an output opening; and a trap void.

The first film take-up roller may include a first drive gear and the second film take-up roller includes a second drive gear.

The first drive gear may be mechanically linked to the second drive gear such that when the first drive gear rotates the second drive gear rotates.

A portion of the first drive gear may be located outside the housing.

The portion of the first drive gear may be located outside the housing enables engagement of a driving mechanism.

The first drive gear may be mechanically linked to the second drive gear such that when the first drive gear rotates the second drive gear rotates.

A portion of the second drive gear may be located outside the housing.

The portion of the second drive gear may be located outside the housing enables engagement of a driving mechanism.

A portion of the first drive gear may be located outside the housing and a portion of the second drive gear is located outside the housing.

The portion of the first drive gear may be located outside the housing enables engagement of a driving mechanism and the portion of the second drive gear located outside the housing enables engagement of the driving mechanism.

The portion of the first drive gear may be located outside the housing enables engagement of a first driving mechanism and the portion of the second drive gear located outside the housing enables engagement of a second driving mechanism.

A delaminating food dispensing system includes a housing; a drive mechanism; a food dispensing module; and a food dispensing module opening; and the food dispensing module including an outer housing, and a delaminating housing; the delaminating housing having a first portion being located within the outer housing and a second portion located outside the outer housing; the food dispensing module delaminating housing including, delaminating nips, a first film take-up roller, a second film take-up roller, an output opening, and a trap void; the output opening being located in the second portion of the delaminating housing.

The first film take-up roller may include a first drive gear and the second film take-up roller includes a second drive gear.

The first drive gear may be mechanically linked to the second drive gear such that when the first drive gear rotates the second drive gear rotates.

A portion of the first drive gear may be located outside the housing.

The portion of the first drive gear may be located outside the housing enables engagement of a driving mechanism.

The first drive gear may be mechanically linked to the second drive gear such that when the first drive gear rotates the second drive gear rotates.

A portion of the second drive gear may be located outside the housing.

The portion of the second drive gear may be located outside the housing enables engagement of a driving mechanism.

A portion of the first drive gear may be located outside the housing and a portion of the second drive gear is located outside the housing.

The portion of the first drive gear may be located outside the housing enables engagement of a driving mechanism and the portion of the second drive gear located outside the housing enables engagement of the driving mechanism.

The portion of the first drive gear may be located outside the housing enables engagement of a first driving mechanism and the portion of the second drive gear located outside the housing enables engagement of a second driving mechanism.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A food dispensing module for a delaminating food dispensing system comprising:
    an outer housing; and
    a delaminating housing;
    said delaminating housing having a first portion being located within said outer housing and a second portion located outside said outer housing;
    said delaminating housing including,
        delaminating nips configured to delaminate a laminated food product,
        a first film take-up roller configured to collect a first film created by delaminating a laminated food product,
        a second film take-up roller configured to collect a second film created by delaminating a laminated food product,
        an output opening configured to output a delaminated food product, and
        a trap void located within said delaminating housing and configured to collect waste created by delaminating a laminated food product;
    said output opening being located in said second portion of said delaminating housing.

2. The food dispensing module as claimed in claim 1, wherein said first film take-up roller includes a first drive gear and said second film take-up roller includes a second drive gear.

3. The delaminating food dispensing module as claimed in claim 2, wherein said first drive gear is mechanically linked to said second drive gear such that when said first drive gear rotates said second drive gear rotates.

4. The food dispensing module as claimed in claim 2, wherein a portion of said first drive gear is located outside said delaminating housing and outside said outer housing.

5. The food dispensing module as claimed in claim 4, wherein said portion of said first drive gear located outside said delaminating housing and outside said outer housing operatively engages a driving mechanism.

6. The food dispensing module as claimed in claim 5, wherein said first drive gear is mechanically linked to said second drive gear such that when said first drive gear rotates said second drive gear rotates.

7. The food dispensing module as claimed in claim 2, wherein a portion of said second drive gear is located outside said delaminating housing and outside said outer housing.

8. The food dispensing module as claimed in claim 7, wherein said portion of said second drive gear located outside said delaminating housing and outside said outer housing operatively engages a driving mechanism.

9. The food dispensing module as claimed in claim 2, wherein a portion of said first drive gear is located outside said delaminating housing and outside said outer housing and a portion of said second drive gear is located outside said delaminating housing and outside said outer housing.

10. The food dispensing module as claimed in claim 9, wherein said portion of said first drive gear located outside said delaminating housing and outside said outer housing operatively engages a driving mechanism and said portion of said second drive gear located outside said delaminating housing and outside said outer housing operatively engages the driving mechanism.

11. The food dispensing module as claimed in claim 9, wherein said portion of said first drive gear located outside said delaminating housing and outside said outer housing operatively engages a first driving mechanism and said portion of said second drive gear located outside said delaminating housing and outside said outer housing operatively engages a second driving mechanism.

12. The food dispensing module as claimed in claim 1, wherein said delaminating housing is detachably attached to said outer housing.

13. The food dispensing module as claimed in claim 1, wherein said outer housing includes laminated food product.

14. The food dispensing module as claimed in claim 1, wherein said outer housing is constructed of bio-degradable material.

15. The food dispensing module as claimed in claim 1, wherein said outer housing is constructed of disposable material.

16. The food dispensing module as claimed in claim 1, wherein said trap void is a first trap void associated with said first film take-up roller.

17. The food dispensing module as claimed in claim 1, further comprising:
   a second trap void;
   said trap void being a first trap void and associated with said first film take-up roller;
   said second trap void being associated with said second film take-up roller.

18. The food dispensing module as claimed in claim 1, wherein said trap void is located in said second portion of said delaminating housing.

19. The food dispensing module as claimed in claim 1, wherein a first portion of said trap void is located in said first portion of said delaminating housing;
   a second portion of said trap void being located in said second portion of said delaminating housing.

20. The food dispensing module as claimed in claim 1, wherein a first portion of said first film take-up roller is located in said first portion of said delaminating housing;
   a second portion of said first film take-up roller being located in said second portion of said delaminating housing;
   a first portion of said second film take-up roller being located in said first portion of said delaminating housing;
   a second portion of said second film take-up roller being located in said second portion of said delaminating housing.

\* \* \* \* \*